(12) United States Patent
Cho et al.

(10) Patent No.: US 11,204,624 B2
(45) Date of Patent: Dec. 21, 2021

(54) FOLDABLE ELECTRONIC DEVICE INCLUDING MAGNETS

(71) Applicant: Samsung Electronics Co., Ltd., Gyeonggi-do (KR)

(72) Inventors: Woosik Cho, Gyeonggi-do (KR); Taewon Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/943,016

(22) Filed: Jul. 30, 2020

(65) Prior Publication Data

US 2021/0034102 A1    Feb. 4, 2021

(30) Foreign Application Priority Data

Aug. 2, 2019    (KR) .................. 10-2019-0094354

(51) Int. Cl.
   *G06F 1/16*    (2006.01)
   *H01F 7/02*    (2006.01)

(52) U.S. Cl.
   CPC .......... *G06F 1/1616* (2013.01); *G06F 1/1652* (2013.01); *G06F 1/1656* (2013.01); *G06F 1/1681* (2013.01); *H01F 7/02* (2013.01)

(58) Field of Classification Search
   CPC .... G06F 1/1616; G06F 1/1652; G06F 1/1656; G06F 1/1681
   See application file for complete search history.

(56) References Cited

U.S. PATENT DOCUMENTS

| | | | |
|---|---|---|---|
| 2013/0155032 A1* | 6/2013 | Kim ..................... | G06F 1/1652 345/204 |
| 2016/0004117 A1* | 1/2016 | Yu ..................... | G02F 1/133308 349/60 |
| 2016/0070304 A1 | 3/2016 | Shin et al. | |
| 2019/0086966 A1 | 3/2019 | Lin et al. | |
| 2019/0104623 A1 | 4/2019 | Backus | |

FOREIGN PATENT DOCUMENTS

| | | |
|---|---|---|
| KR | 1020140056444 | 5/2014 |
| KR | 1020160029543 | 3/2016 |
| KR | 1020190083855 | 7/2019 |

OTHER PUBLICATIONS

International Search Report dated Nov. 25, 2020 issued in counterpart application No. PCT/KR2020/010120, 8 pages.

* cited by examiner

*Primary Examiner* — Anthony Q Edwards
(74) *Attorney, Agent, or Firm* — The Farrell Law Firm, P.C.

(57) ABSTRACT

An electronic device is provided, which includes a first housing, a second housing, a hinge structure, a flexible display configured to form a front surface of the first housing and the second housing while the electronic device is in an unfolded state, a first support member disposed between the flexible display and the first housing, a first bimetal member disposed between the flexible display and the first support member, a first magnet disposed between the flexible display and the first bimetal member, and a second magnet disposed between the flexible display and the second housing. The first bimetal member has a first length at a first temperature and a second length longer than the first length at a second temperature higher than the first temperature. The first support member has a reception space having a length greater than or equal to the first length and less than the second length that provides space for the first bimetal member to bend at the second temperature.

20 Claims, 20 Drawing Sheets

FOLDABLE ELECTRONIC DEVICE INCLUDING MAGNETS

CROSS-REFERENCE TO RELATED APPLICATION(S)

This application is based on and claims priority under 35 U.S.C. § 119 to Korean Patent Application No. 10-2019-0094354, filed on Aug. 2, 2019, in the Korean Intellectual Property Office, the entire disclosure of which is incorporated herein by reference.

BACKGROUND

1. Field

The disclosure relates generally to a foldable electronic device including magnets.

2. Description of Related Art

A flexible display, unlike a flat display, may be folded or bent.

Using a flexible display, a foldable electronic device capable of being folded may be manufactured. A foldable electronic device may include a hinge structure and may be capable of an operation in which the flexible display is folded about the hinge structure.

Magnets may be provided inside a foldable electronic device in order to maintain the folded state of the foldable electronic device. However, the temperature of the electronic device, more specifically, the temperature around the magnets may increase due to heat generated by the electronic device or changes in the external environment (e.g., an increase in ambient temperature, user gripping, and the like), thereby lowering the magnetic force. This may also cause a problem in that the foldable electronic device is not closed well or the folded state thereof is not maintained due to the reduced force of attraction between the magnets. If magnets having relatively high magnetic force are used, a problem may arise in that the foldable electronic device does not easily open due to the high force of attraction between the magnets at a relatively low temperature.

SUMMARY

An aspect of the disclosure is to provide an electronic device that maintains a sufficient force of attraction between magnets, even if the temperature of the magnets (or the temperature around the magnets) changes, thereby providing a consistent manipulation experience to a user during operation of folding the electronic device.

In accordance with an aspect of the disclosure, an electronic device is provided, which includes a first housing; a second housing; a hinge pivotally connecting the first housing to the second housing, wherein the first housing and the second housing substantially face each other while the electronic device is in a folded state and the first housing and the second housing form a substantially flat surface while the electronic device is in a unfolded state; a flexible display forming a front surface of the first housing and the second housing while the electronic device is in the unfolded state; a first support member disposed between the flexible display and the first housing; a first bimetal member disposed between the flexible display and the first support member; a first magnet disposed between the flexible display and the first bimetal member; and a second magnet disposed between the flexible display and the second housing, wherein the first magnet and the second magnet are disposed at corresponding positions and face each other while the electronic device is in the folded state, wherein the first bimetal member has a first length at a first temperature and a second length, which is longer than the first length, at a second temperature, which is higher than the first temperature, and wherein the first support member has a reception space having a length greater than or equal to the first length and less than the second length that provides space for the first bimetal member to bend at the second temperature.

In accordance with another aspect of the disclosure, an electronic device is provided, which includes a first housing; a second housing; a hinge connecting the first housing and the second housing, wherein the first housing and the second housing form a substantially flat surface while the electronic device is in an unfolded state; a flexible display disposed on a front surface of the first housing and the second housing while the electronic device is in the unfolded state; a first support member disposed between the flexible display and the first housing; a first bimetal member disposed between the flexible display and the first support member; a first magnet disposed between the flexible display and the first bimetal member; a first elastic member disposed between the flexible display and the first magnet; and a second magnet disposed between the flexible display and the second housing, wherein the first magnet overlaps the first bimetal member and the first elastic member, wherein the first magnet and the second magnet are disposed at corresponding positions and face each other while the electronic device is in a folded state, wherein the first bimetal member has a first length at a first temperature and a second length, which is longer than the first length, at a second temperature, which is higher than the first temperature, and wherein the first support member has a reception space having a length greater than or equal to the first length and less than the second length that provides space for the first bimetal member to bend toward the first magnet at the second temperature.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Various embodiments of the disclosure will now be described in detail with reference to the accompanying drawings. In the following description, specific details such as detailed configuration and components are merely provided to assist the overall understanding of these embodiments of the disclosure. Therefore, it should be apparent to those skilled in the art that various changes and modifications of the embodiments described herein can be made without departing from the scope and spirit of the disclosure. In addition, descriptions of well-known functions and constructions are omitted for clarity and conciseness.

Figure 1:
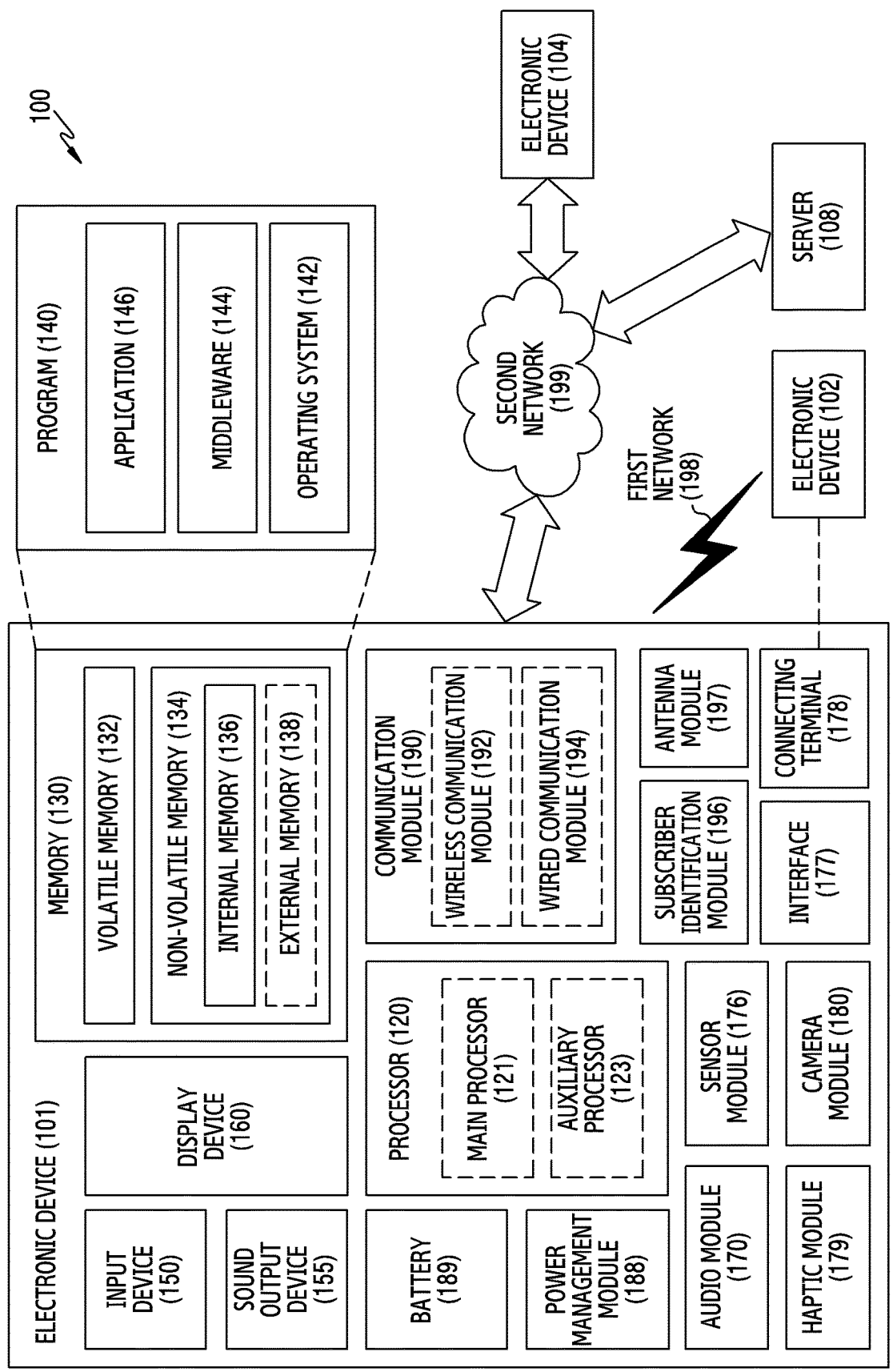
FIG. 1 illustrates an electronic device in a network environment according to an embodiment.

FIG. 1 illustrates an electronic device in a network environment according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, and an antenna module 197. Alternatively, at least one of the components (e.g., the display device 160 or the camera module 180) may be omitted from the electronic device 101, or one or more other components may be added in the electronic device 101. Some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 includes a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include software (e.g., the program 140) and input data or output data for a command related thereto. The memory 130 includes the volatile memory 132 and the non-volatile memory 134.

The program 140 may be stored in the memory 130 as software, and includes, for example, an operating system (OS) 142, middleware 144, and an application 146.

The input device 150 may receive a command or data to be used by another component (e.g., the processor 120) of the electronic device 101, from the outside (e.g., a user) of the electronic device 101. The input device 150 may include a microphone, a mouse, a keyboard, or a digital pen (e.g., a stylus pen).

The sound output device 155 may output sound signals to the outside of the electronic device 101. The sound output device 155 may include a speaker or a receiver. The speaker may be used for general purposes, such as playing multimedia or playing record, and the receiver may be used for an incoming calls. The receiver may be implemented as separate from, or as part of the speaker.

The display device 160 may visually provide information to the outside (e.g., a user) of the electronic device 101. The display device 160 may include a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). The connecting terminal 178 may include an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include a motor, a piezoelectric element, or an electric stimulator.

The camera module 180 may capture a still image or moving images. The camera module 180 may include one or more lenses, image sensors, ISPs, or flashes.

The power management module 188 may manage power supplied to the electronic device 101. The power management module 188 may be implemented as at least part of a power management integrated circuit (PMIC).

The battery 189 may supply power to at least one component of the electronic device 101. The battery 189 may include a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. The communication module 190 includes a wireless communication module 192 (e.g., a cellular communication module, a short-range wireless communication module, or a global navigation satellite system (GNSS) communication module) and a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., PCB). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192), from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, cloud computing, distributed computing, or client-server computing technology may be used.

An electronic device according to an embodiment may be a portable communication device (e.g., a smartphone), a computer device, a portable multimedia device, a portable medical device, a camera, a wearable device, or a home appliance. However, an electronic devices is not limited to the above-described examples.

Various embodiments of the disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements. A singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases.

Terms such as "1st" and "2nd," or "first" and "second" may be used to simply distinguish a corresponding component from another, and do not limit the components in other aspect (e.g., importance or order).

If an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

The term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, a module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. Accordingly, the machine may be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2:
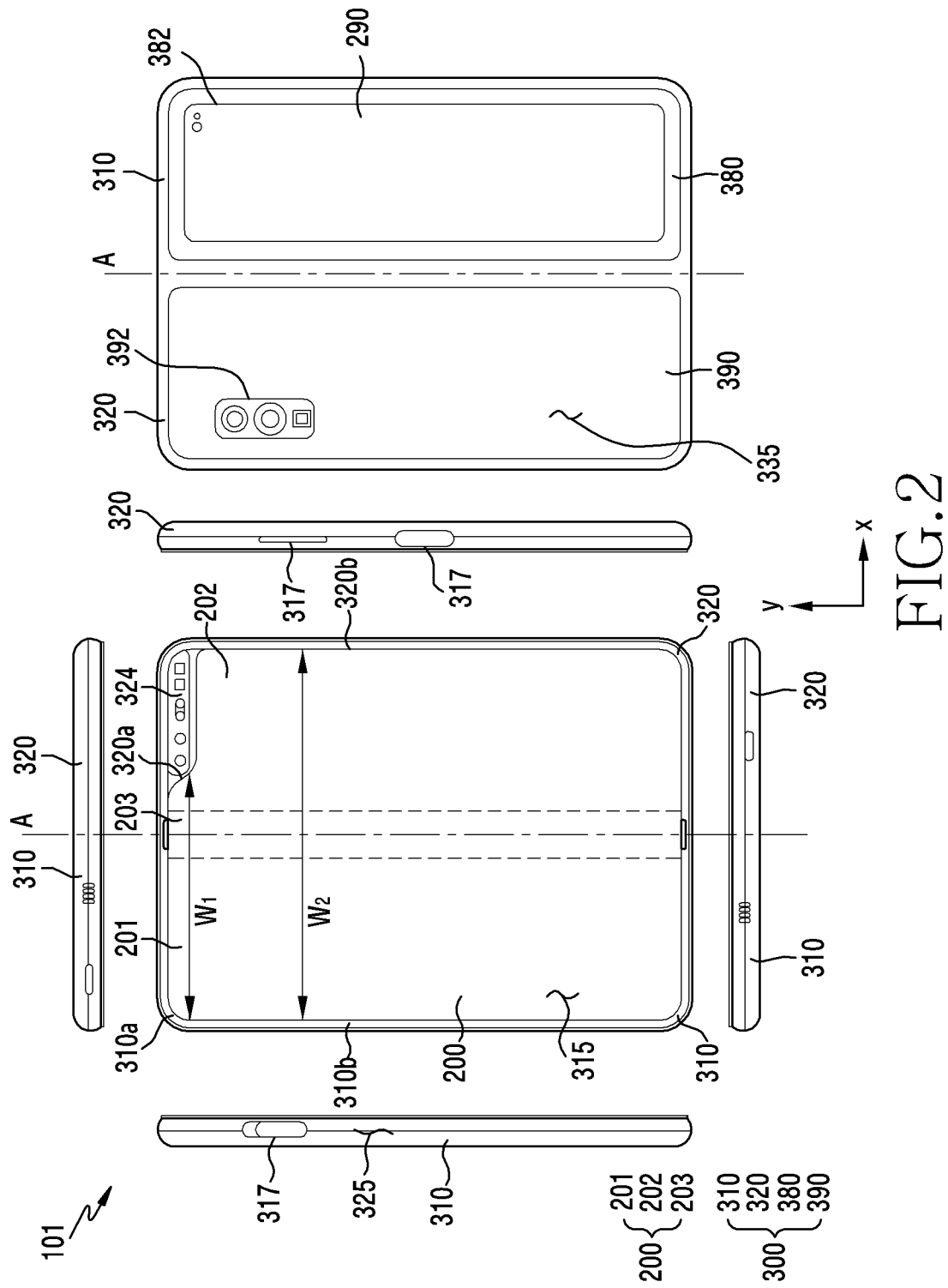
FIG. 2 illustrates an unfolded state of an electronic device according to an embodiment.
Figure 3:
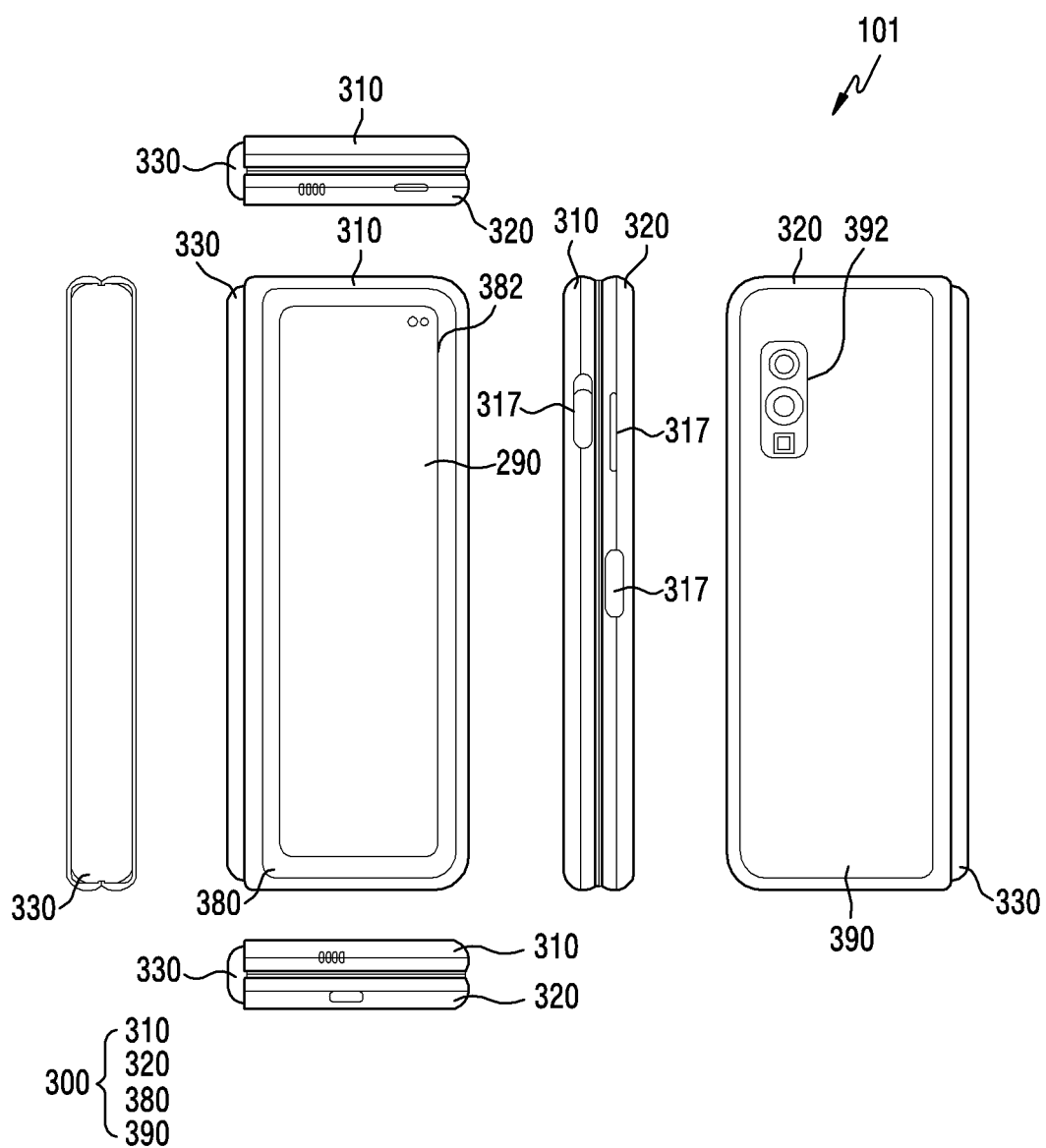
FIG. 3 illustrates a folded state of an electronic device according to an embodiment.

FIG. 2 illustrates an unfolded state of an electronic device according to an embodiment, and FIG. 3 illustrates a folded state of an electronic device according to an embodiment.

Referring to FIGS. 2 and 3, the electronic device 101 includes a foldable housing 300, a hinge cover 330 that covers a foldable portion of the foldable housing, and a flexible or foldable display 200 arranged in the space formed by the foldable housing 300 (hereinafter, referred to as "display" 200). The electronic device 101 includes a front surface 315 on which the display 200 is arranged, a rear surface 335 opposite of the front surface 315, and a side surface 325 surrounding the space between the front surface 315 and the rear surface 335.

The foldable housing 300 includes a first housing structure 310, a second housing structure 320 including a sensor area 324, a first rear cover 380, and a second rear cover 390. The foldable housing 300 of the electronic device 101 is not limited to the form and configuration illustrated in FIGS. 2 and 3, and may be implemented in other combinations and/or configurations of forms or components. For example, the first housing structure 310 and the first rear cover 380 may be integrally formed with each other, and/or the second housing structure 320 and the second rear cover 390 may be integrally formed with each other.

The first housing structure 310 and the second housing structure 320 may be arranged on both sides of a folding axis (an axis A), and may be symmetrical in their overall form about the folding axis A. The first housing structure 310 and the second housing structure 320 may have different angles or distances therebetween depending on whether the electronic device 101 is in an unfolded state, a folded state, or an intermediate state. The second housing structure 320, unlike the first housing structure 310, further includes the sensor area 324 in which various sensors are arranged, but may be symmetrical with the first housing structure 310 in areas other than the sensor area.

Both the first housing structure 310 and the second housing structure 320 have a recess formed therein to receive the display 200. The recess may have two or more different widths in the direction perpendicular to the folding axis A because of the sensor area 324.

The recess has (1) a first width w1 between a first portion 310a of the first housing structure 310, which is parallel to the folding axis A, and a first portion 320a of the second housing structure 320, which is formed at the edge of the sensor area 324, and (2) a second width w2 between a second portion 310b of the first housing structure 310 and a second portion 320b of the second housing structure 320, which does not belong to the sensor area 324 and is parallel to the folding axis A. The second width w2 is longer than the first width w1. In other words, the first portion 310a of the first housing structure 310 and the first portion 320a of the second housing structure 320, which are asymmetrical with each other, may form the first width w1 of the recess, and the second portion 310b of the first housing structure 310 and the second portion 320b of the second housing structure 320, which are symmetrical with each other, may form the second width w2 of the recess. The distances from the folding axis A to the first portion 320a and the second portion 320b of the second housing structure 320 may be different from each other. The widths of the recess are not limited to the illustrated example. The recess may have a plurality of widths depending on the shape of the sensor area 324 or a portion in which the first housing structure 310 and the second housing structure 320 are asymmetrical with each other.

At least a portion of the first housing structure 310 and the second housing structure 320 may be formed of a metallic material or a non-metallic material having a specified strength to support the display 200.

The sensor area 324 may be formed to have a predetermined area adjacent to one corner of the second housing structure 320. However, the arrangement, shape, and size of the sensor area 324 are not limited to this illustrated example. For example, the sensor area 324 may be provided in another corner of the second housing structure 320 or in any area between the top corner and the bottom corner thereof. Components for performing various functions, which are embedded in the electronic device 101, may be exposed on the front surface 315 of the electronic device 101 through the sensor area 324 or through one or more openings formed in the sensor area 324. The components may include various types of sensors, e.g., at least one of a front camera, a receiver, or a proximity sensor.

The first rear cover 380 may be arranged at one side of the folding axis on the rear surface 335 of the electronic device, and the first rear cover 380 may have a substantially rectangular periphery, which is surrounded by the first housing structure 310. Likewise, the second rear cover 390 may be arranged at the other side of the folding axis on the rear surface 335 of the electronic device, and the periphery thereof may be surrounded by the second housing structure 320.

The first rear cover 380 and the second rear cover 390 may be substantially symmetrical about the folding axis (the axis A). However, the first rear cover 380 and the second rear cover 390 are not necessarily symmetrical with each other, and instead, the electronic device 101 may include the first rear cover 380 and the second rear cover 390 in various forms. The first rear cover 380 may be integrally formed with the first housing structure 310, and the second rear cover 390 may be integrally formed with the second housing structure 320.

The first rear cover 380, the second rear cover 390, the first housing structure 310, and the second housing structure 320 may form a space in which various components of the electronic device 101 (e.g., a printed circuit board or a battery) may be arranged. One or more components may be arranged or visually exposed on the rear surface 335 of the electronic device 101. At least a portion of a sub-display 290 may be visually exposed through a first rear area 382 of the first rear cover 380.

One or more components or sensors may be visually exposed through a second rear area 392 of the second rear cover 390. The sensors may include a proximity sensor and/or a rear camera.

The electronic device 101 includes a key input device 317, which may include function buttons such as a volume control button or a power button. The key input device 317 is arranged on the side surface 325 of the electronic device 101. Alternatively, the electronic device 101 may exclude some configurations from the key input device 317 described above, and the excluded configurations of the key input device may be implemented in other forms such as soft keys on the display 200. The key input device 317 may include various types of sensor modules. The key input device 317 may include a fingerprint recognition sensor module. The fingerprint recognition sensor module may be mounted to the key input device 317, and the key input device 317 may be used as a multi-purpose fingerprint sensor button.

Referring to FIG. 3, the hinge cover 330 may be arranged between the first housing structure 310 and the second housing structure 320 to cover the internal components (e.g., a hinge structure 340). The hinge cover 330 may be covered by a portion of the first housing structure 310 and the second housing structure 320, or may be exposed to the outside depending on the state (unfolded state or folded state) of the electronic device 101.

If the electronic device 101 is in the unfolded state as illustrated in FIG. 2, the hinge cover 330 may not be exposed while being covered by the first housing structure 310 and the second housing structure 320. If the electronic device 101 is in a folded state (e.g., a fully folded state) as illustrated in FIG. 3, the hinge cover 330 may be exposed to the outside between the first housing structure 310 and the second housing structure 320. If the first housing structure 310 and the second housing structure 320 are in an intermediate state in which they are folded at a certain angle, a portion of the hinge cover 330 may be exposed to the outside between the first housing structure 310 and the second housing structure 320. However, the exposed area in this case may be less than that in the fully folded state. The hinge cover 330 may include a curved surface.

The display 200 may be arranged in a space formed by the foldable housing 300. The display 200 may be placed in the recess formed by the foldable housing 300, thereby constituting most of the front surface 315 of the electronic device 101.

The front surface 315 of the electronic device 101 includes the display 200, a portion of the first housing structure 310 adjacent to the display 200, and a portion of the second housing structure 320 adjacent to the display 200. In addition, the rear surface 335 of the electronic device 101 includes the first rear cover 380, a portion of the first housing structure 310 adjacent to the first rear cover 380, the second rear cover 390, and a portion of the second housing structure 320 adjacent to the second rear cover 390.

The display 200 may denote a display in which at least a portion thereof is capable of being deformed into an unfolded surface or a curved surface. The display 200 includes a folding area 203, a first area 201 arranged at one side of the folding area 203 (the left side of the folding area 203 illustrated in FIG. 2), and a second area 202 arranged at the other side thereof (the right side of the folding area 203 illustrated in FIG. 2).

The divided areas of the display 200 illustrated in FIG. 2 are only an example, and the display 200 may be divided into a plurality of areas (e.g., four or more, or two areas) according to the structure or function thereof. Although the areas of the display 200 are divided based on the folding area 203 or the folding axis (the axis A), which extends parallel to the y-axis, the display 200 may be divided into areas based on another folding area (e.g., a folding area parallel to the x-axis) or another folding axis (e.g., a folding axis parallel to the x-axis) according to another embodiment.

The first area 201 and the second area 202 may be substantially symmetrical about the folding area 203. However, the second area 202, unlike the first area 201, may include a notch that is cut due to the presence of the sensor area 324, but the remaining area of the second area 202 may be symmetrical with the first area 201. That is, the first area 201 and the second area 202 may include portions that are symmetrical with each other and portions that are asymmetrical with each other.

If the electronic device 101 is in the unfolded state of FIG. 2, the first housing structure 310 and the second housing structure 320 are arranged at an angle of 180 degrees to face in the same direction. The surface of the first area 201 and the surface of the second area 202 of the display 200 may form an angle of 180 degrees therebetween, and may face the same direction (e.g., toward the front surface 315 of the electronic device). The folding area 203 may form the same surface as the first area 201 and the second area 202.

If the electronic device 101 is in the fully folded state of FIG. 3, the first housing structure 310 and the second housing structure 320 are arranged to face each other. The surface of the first area 201 and the surface of the second area 202 of the display 200 may form a narrow angle therebetween (e.g., 0 degrees to 10 degrees) to thereby face each other. At least a portion of the folding area 203 may be formed in a curved surface having a predetermined curvature. If the electronic device 101 is in a fully folded state, the display 200 may be invisible to the user.

If the electronic device 101 is in an intermediate state, the first housing structure 310 and the second housing structure 320 may be arranged at a certain angle with each other. The surface of the first area 201 and the surface of the second area 202 of the display 200 may form an angle greater than that in the folded state and smaller than that in the unfolded state. At least a portion of the folding area 203 may be formed in a curved surface having a predetermined curvature, which may be smaller than that in the folded state.

It is noted that if the electronic device 101 is in a reversely folded state, the first housing structure 310 and the second housing structure 320 may be arranged such that the first rear cover 380 and the second rear cover 390 face each other. The display 200 may be viewable from the outside while the electronic device 101 is in the reversely folded state. At least a portion of the folding area 203 of the display 200 may be formed in a curved surface having a predetermined curvature, which may be smaller than that in the fully folded state. The hinge cover 330 may be invisible from the outside while the electronic device 101 is in the reversely folded state.

The folded state of the electronic device 101 may denote the fully folded state or the reversely folded state thereof. Although the following description will be made without distinguishing the fully folded state of the electronic device 101 from the reversely folded state thereof, this is only for convenience of description.

Figure 4:
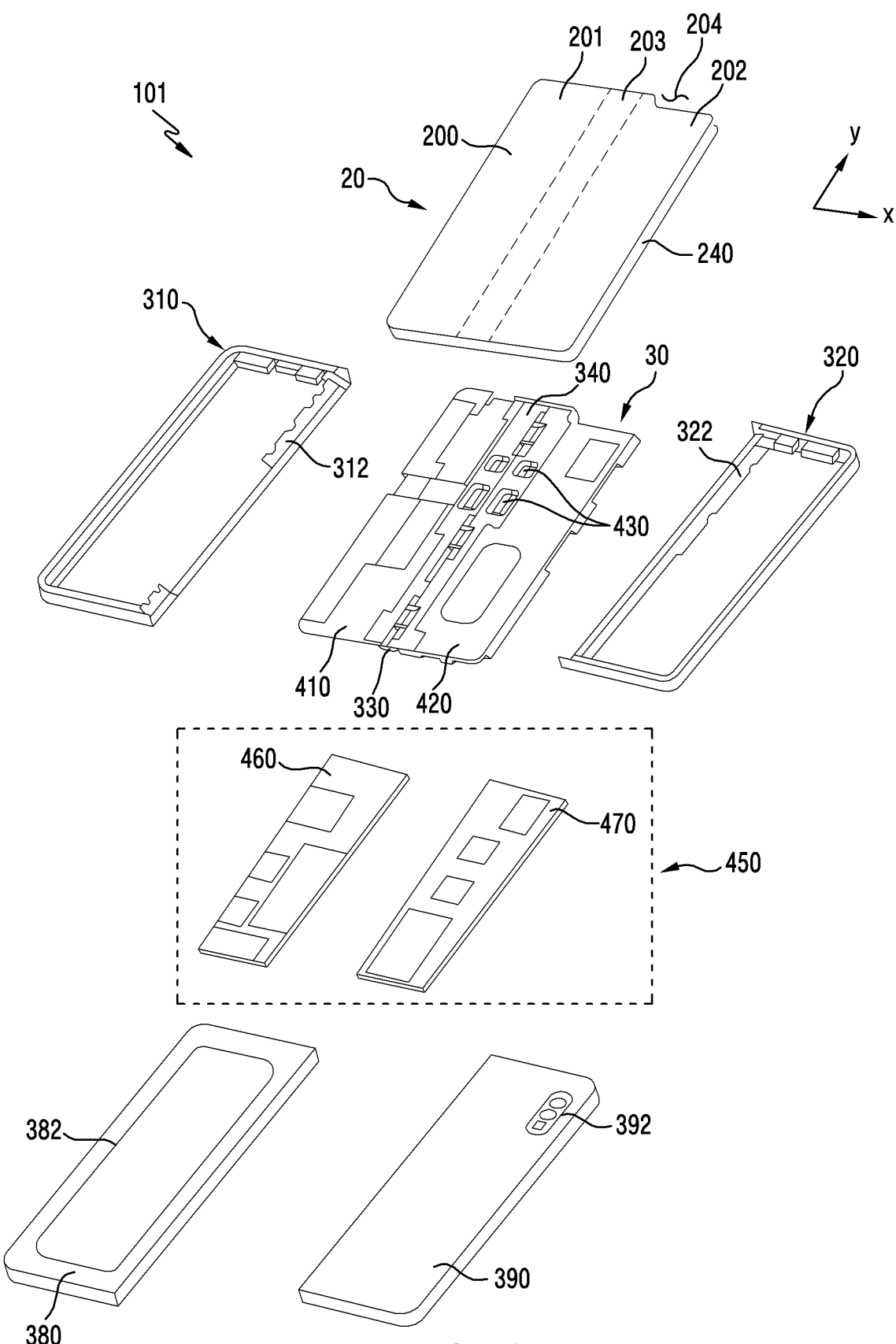
FIG. 4 illustrates an exploded perspective view of an electronic device according to an embodiment.

FIG. 4 illustrates an exploded perspective view of an electronic device according to an embodiment.

Referring to FIG. 4, the electronic device 101 includes a display unit 20, a bracket assembly 30, a substrate 450, a first housing structure 310, a second housing structure 320, a first rear cover 380, and a second rear cover 390. The display unit 20 may refer to a display module or a display assembly.

The display unit 20 includes a display 200 and one or more plates or layers 240 on which the display 200 is placed. The plate 240 may be arranged between the display 200 and the bracket assembly 30. The display 200 may be arranged on at least a portion of one surface of the plate 240 (e.g., the upper surface in FIG. 4). The plate 240 may be formed in a shape corresponding to the display 200. A portion of the plate 240 may be formed in a shape corresponding to the notch 204 in the display 200.

The bracket assembly 30 includes a first bracket 410, a second bracket 420, a hinge structure 340 arranged between the first bracket 410 and the second bracket 420, a hinge cover 330 that covers the hinge structure 340 so as to be invisible to the outside, and a wiring member 430 that traverses the first bracket 410 and the second bracket 420, e.g., a flexible printed circuit board (FPC).

the bracket assembly 30 may be arranged between the plate 240 and the substrate 450. The first bracket 410 may be arranged between the first area 201 of the display 200 and the first substrate 460. The second bracket 420 may be arranged between the second area 202 of the display 200 and the second substrate 470.

At least a portion of the wiring member 430 and the hinge structure 340 may be arranged inside the bracket assembly 30. The wiring member 430 may be arranged in a direction across the first bracket 410 and the second bracket 420 (e.g., in the x-axis direction). The wiring member 430 may be arranged in a direction (e.g., in the x-axis direction) perpendicular to the folding axis (e.g., the y-axis or the folding axis A as illustrated in FIG. 2) of the folding area 203 of the electronic device 101.

The substrate 450 includes the first substrate 460 arranged at the first bracket 410 and the second substrate 470 arranged at the second bracket 420. The first substrate 460 and the second substrate 470 may be arranged inside a space formed by the bracket assembly 30, the first housing structure 310, the second housing structure 320, the first rear cover 380, and the second rear cover 390. The components for implementing various functions of the electronic device 101 may be mounted on the first substrate 460 and the second substrate 470.

The first housing structure 310 and the second housing structure 320 may be coupled to each other by assembling the same from both sides of the bracket assembly 30 in the state in which the display unit 20 is coupled to the bracket assembly 30. The first housing structure 310 and the second housing structure 320 may be coupled to the bracket assembly 30 by sliding from both sides of the bracket assembly 30.

The first housing structure 310 includes a first rotation support surface 312, and the second housing structure 320 includes a second rotation support surface 322 corresponding to the first rotation support surface 312. The first rotation support surface 312 and the second rotation support surface 322 may include a curved surface corresponding to the curved surface included in the hinge cover 330.

If the electronic device 101 is in the unfolded state as illustrated in FIG. 2, the first rotation support surface 312 and the second rotation support surface 322 may cover the hinge cover 330 to prevent the hinge cover 330 from being exposed through the rear surface of the electronic device 101 or minimize the exposure thereof. However, if the electronic device 101 is in the folded state as illustrated in FIG. 3, the first rotation support surface 312 and the second rotation support surface 322 may rotate along the curved surface included in the hinge cover 330, thereby maximizing the exposure of the hinge cover 330 through the rear surface of the electronic device 101.

Figure 5A:
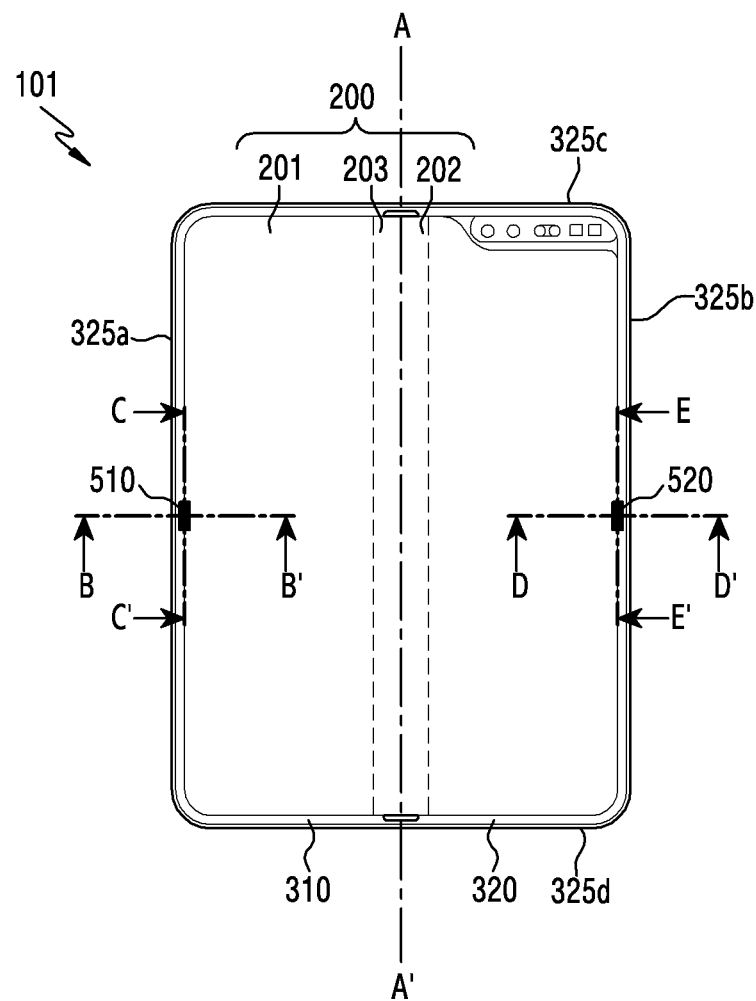
FIG. 5A illustrates an unfolded state of an electronic device including magnets according to an embodiment.
Figure 5B:
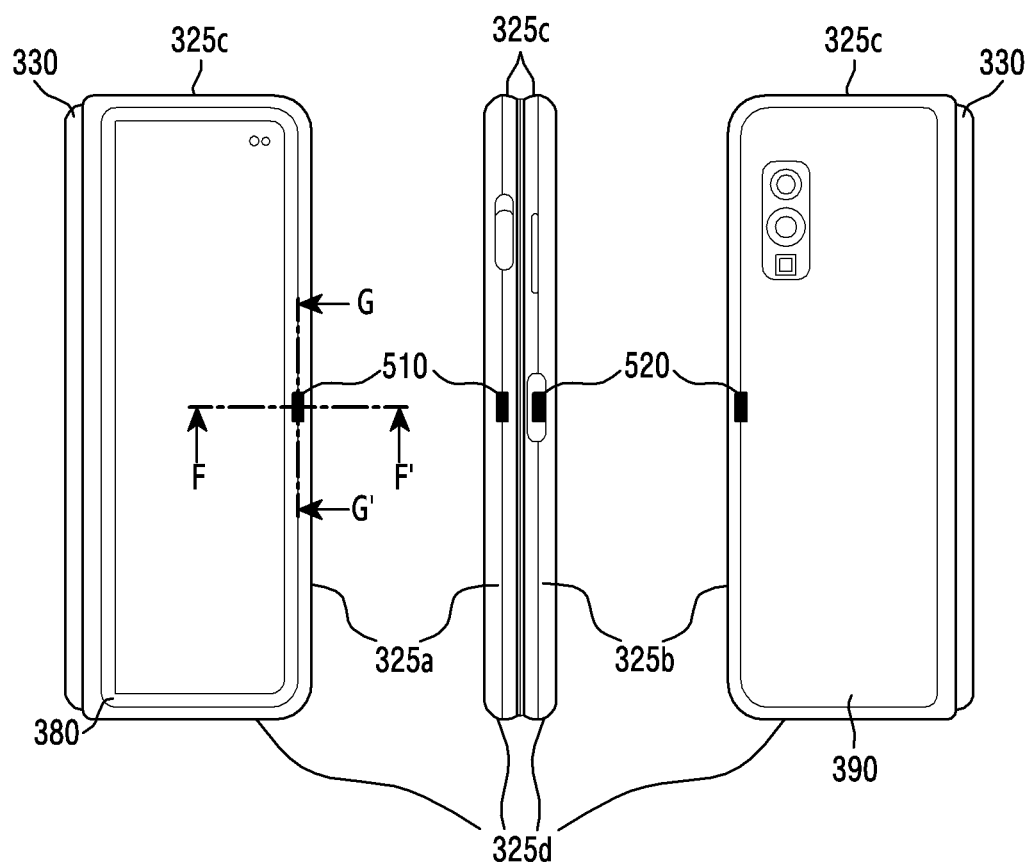
FIG. 5B illustrates a folded state of an electronic device including magnets according to an embodiment.

FIG. 5A illustrates an unfolded state of an electronic device including magnets according to an embodiment, and FIG. 5B illustrates a folded state of an electronic device including magnets according to an embodiment.

Although FIG. 5B illustrates only the fully folded state of the electronic device 101, this is only for the convenience of description, and is not intended to exclude the reversely folded state of the electronic device 101.

Referring to FIGS. 5A and 5B, the electronic device 101 includes a foldable housing 300, a flexible display 200, a first magnet 510, and a second magnet 520.

The foldable housing 300 includes a first housing structure 310 and a second housing structure 320. The foldable housing 300 may form a rear surface and a side surface of the electronic device 101 while the electronic device 101 is in the unfolded state.

The first housing structure 310 and the second housing structure 320 may be arranged on both sides of the folding axis (the line A-A'). The first housing structure 310 and the second housing structure 320 may be connected to a bracket assembly including a hinge structure. The first housing structure 310 may rotate about the hinge structure. The second housing structure 320 may rotate about the hinge structure. The foldable housing 300 may be folded or unfolded by the rotation of the first housing structure 310 and the second housing structure 320 about the folding axis (the line A-A').

The foldable housing 300 may have a recess for receiving other components of the electronic device 101. The foldable housing 300 may receive the flexible display 200 in the recess.

In the unfolded state, the foldable housing 300 may include a first periphery 325a substantially parallel to the folding axis (the line A-A'), a second periphery 325b substantially parallel to the first periphery 325a, a third periphery 325c extending from one end of the first periphery 325a to one end of the second periphery 325b in a direction substantially perpendicular to the first periphery 325a, and a fourth periphery 325d extending from the opposite end of the first periphery 325a to the opposite end of the second periphery 325b to be substantially parallel to the third periphery 325c.

The flexible display 200 may be arranged in the recess of the foldable housing 300. The flexible display 200 may form the front surface of the electronic device 101 while the electronic device 101 is in the unfolded state. The flexible display 200 may be supported by the foldable housing 300. Since the flexible display 200 ranges from the first housing structure 310 to the second housing structure 320 across the folding axis (line A-A'), the electronic device 101 may be bent or unfolded according to folding or unfolding thereof.

The flexible display 200 includes the first area 201 corresponding to the first housing structure 310, a second area 202 corresponding to the second housing structure 320, and a folding area 203 that is formed between the first area 201 and the second area 202 and includes the folding axis (line A-A'). The flexible display 200 may include an area that is folded or unfolded according to the operation of folding the electronic device 101. The folding area 203 of the flexible display 200 may be the area that is folded or unfolded according to the operation of folding the electronic device 101.

The flexible display 200 may be formed in a plurality of layers. The flexible display 200 may include an electromagnetic wave shielding layer, a substrate layer, a thin film transistor (TFT) layer, an electrode layer, a protective layer, an organic layer, or a pixel layer. The substrate may be formed of plastic, e.g., polyimide (PI), polyethylene terephthalate (PET), or polycarbonate (PC), a glass thin film, or a metal thin film that are deformable according to the operation of folding the electronic device 101. The flexible display 200 may emit light from pixels in order to transmit information to the user, and the emitted light may travel to the outside through a transparent protective layer. All of the flexible display 200 or at least the folding area 203 thereof may be formed of a flexible material.

The first magnet 510 may be arranged between the flexible display 200 and the first rear cover 380 of the first housing structure 310. The first magnet 510 may be arranged close to the first periphery 325a. The first magnet 510 may be arranged to be closer to the first periphery 325a than to the folding axis (the line A-A'). A portion of the first magnet 510 may overlap a portion of the first area 201 of the flexible display 200.

The second magnet 520 may be arranged between the flexible display 200 and the second rear cover 390 of the second housing structure 320. The second magnet 520 may be arranged close to the second periphery 325b. the second magnet 520 may be arranged closer to the second periphery 325b than to the folding axis (the line A-A'). A portion of the second magnet 520 may overlap a portion of the second area 202 of the flexible display 200.

When the electronic device 101 is in the unfolded state, the positions where the first magnet 510 and the second magnet 520 are arranged may correspond to each other. When the electronic device 101 is in the unfolded state, a straight line perpendicular to the folding axis (the line A-A') may pass through the first magnet 510 and the second magnet 520.

When the electronic device 101 is in the folded state, the positions where the first magnet 510 and the second magnet 520 are arranged may correspond to each other. When the electronic device 101 is in the folded state, the first magnet 510 and the second magnet 520 may be stacked, or may overlap each other.

The first magnet 510 may include a surface facing the first area 201 and a surface facing the first rear cover 380. The second magnet 520 may include a surface facing the second area 202 and a surface facing the second rear cover 390. The surface of the first magnet 510 facing the first area 201 and the surface of the second magnet 520 facing the second area 202 may have different poles from each other. The surface of the first magnet 510 facing the first rear cover 380 and the surface of the second magnet 520 facing the second rear cover 390 may have different poles from each other.

The first magnet 510 and the second magnet 520 may be brought close to each other according to the operation of folding the electronic device 101. If the electronic device 101 is in the folded state, the first magnet 510 and the second magnet 520 may be stacked, or may overlap each other. When the electronic device 101 is in the folded state, since the surfaces of the first magnet 510 and the second magnet 520, which face each other, have different poles from each other, attractive force may act on the first magnet 510 and the second magnet 520. The strength of the force of attraction between the first magnet 510 and the second magnet 520 may vary depending on the distance between the first magnet 510 and the second magnet 520. For example, as the distance between the first magnet 510 and the second magnet 520 is reduced, the strength of the force of attraction between the first magnet 510 and the second magnet 520 may increase.

The magnetic force between the first magnet 510 and the second magnet 520 may be reduced as the temperature thereof increases. That is, if the temperature increases, the force of attraction between the first magnet 510 and the second magnet 520 may be reduced.

Figure 6A:
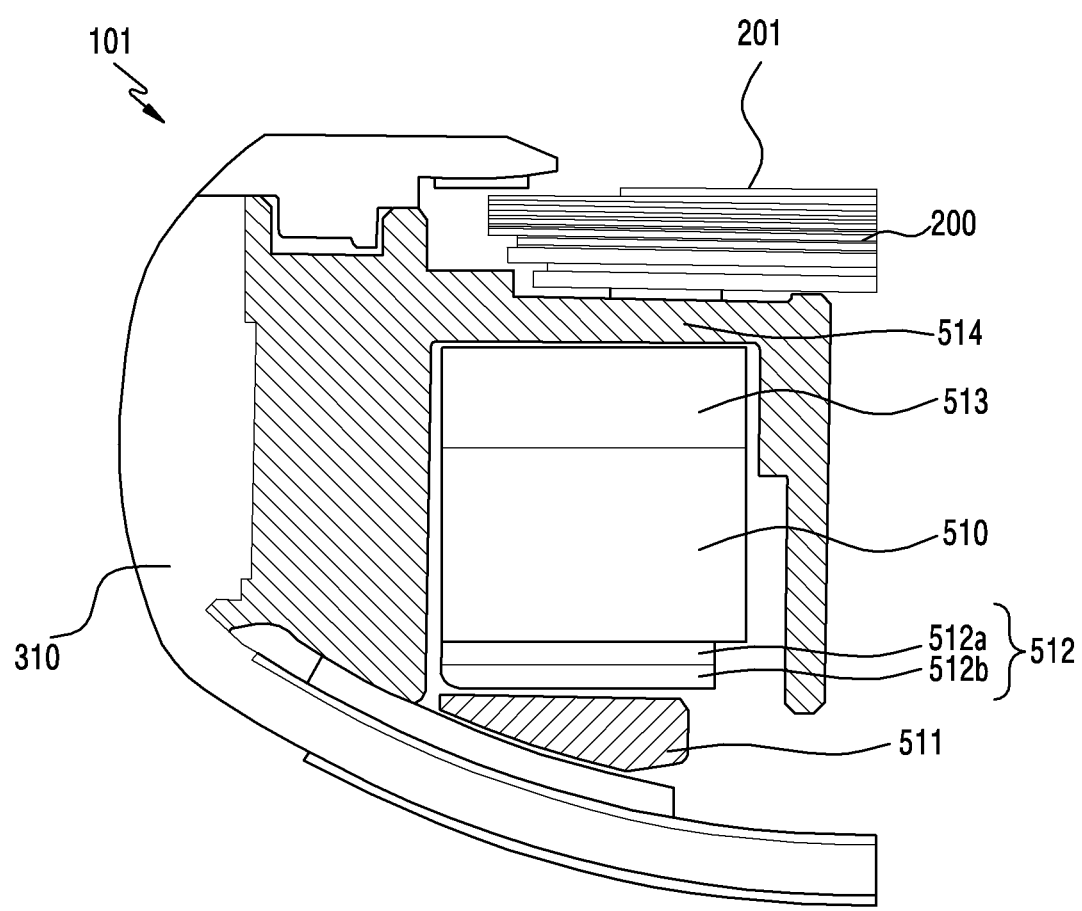
FIG. 6A illustrates a cross-sectional view of the electronic device in FIG. 5A viewed from the line B-B' according to an embodiment.
Figure 6B:
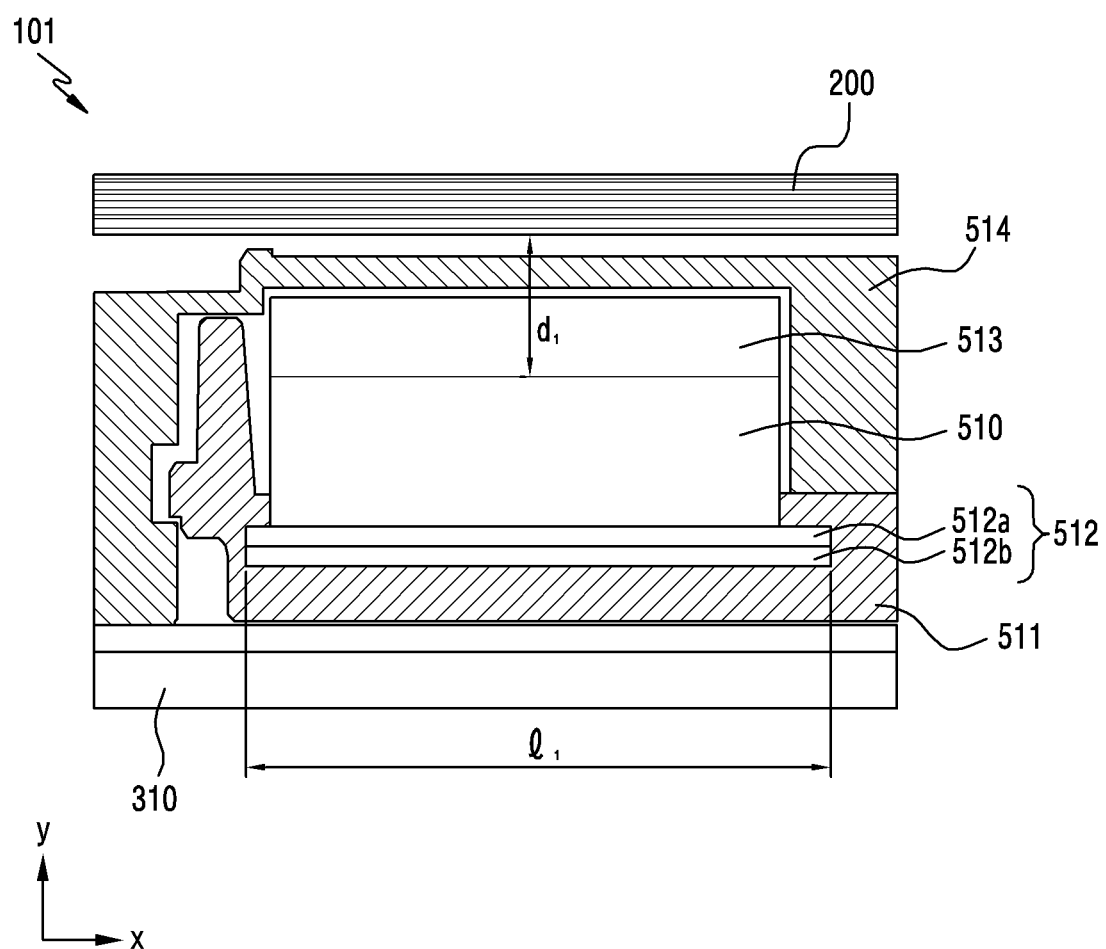
FIG. 6B illustrates a cross-sectional view of the electronic device in FIG. 5A viewed from the line C-C' at a first temperature according to an embodiment.
Figure 6C:
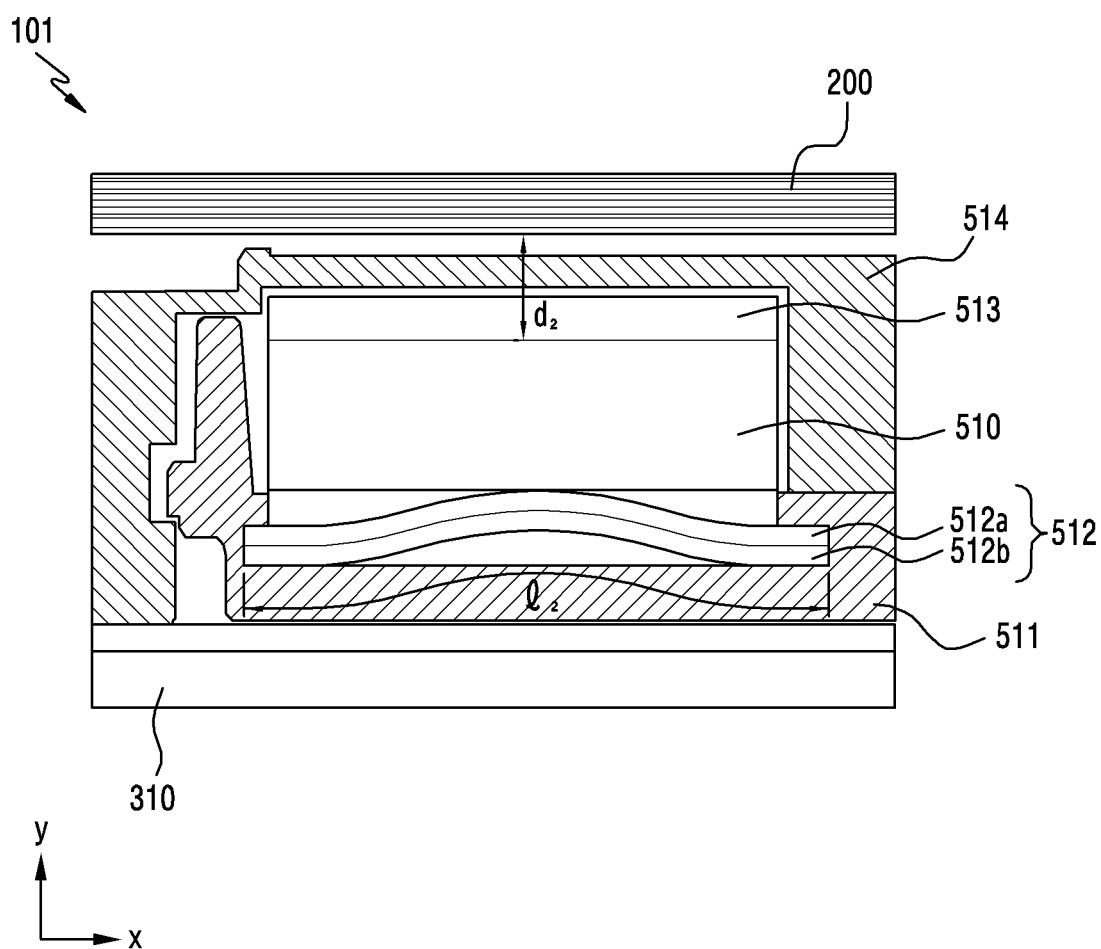
FIG. 6C illustrates a cross-sectional view of the electronic device in FIG. 5A viewed from the line C-C' at a second temperature higher than the first temperature according to an embodiment.

FIG. 6A illustrates a cross-sectional view of the electronic device in FIG. 5A viewed from the line B-B' according to an embodiment, FIG. 6B illustrates a cross-sectional view of the electronic device in FIG. 5A viewed from the line C-C' at a first temperature according to an embodiment, and FIG. 6C illustrates a cross-sectional view of the electronic device in FIG. 5A viewed from the line C-C' at a second temperature higher than the first temperature according to an embodiment.

Referring to FIGS. 6A, 6B, and 6C, the electronic device 101 includes a first support member 511, a first bimetal member 512, a first magnet 510, a first elastic member 513, and a first side member 514.

The first support member 511 is arranged between the flexible display 200 and the first housing structure 310. The first support member 511 may have the first housing structure 310 coupled to one surface thereof and other components arranged on the opposite surface thereof. The first support member 511 may form a first reception space in which the first bimetal member 512, the first magnet 510, and the first elastic member 513 are arranged. The first reception space of the first support member 511 may further include a groove into which at least a portion of the first bimetal member 512 may be inserted. At least a portion of the first magnet 510 may be arranged to be inserted into the first reception space. Alternatively, the first support member 511 may be integrally formed with the first housing structure 310 so as to extend therefrom.

The first bimetal member 512 may be arranged in the first reception space formed in the first support member 511. At least a portion of the first bimetal member 512 may be inserted into the groove formed in the first reception space.

The first bimetal member 512 includes a first metal member 512a and a second metal member 512b. The first metal member 512a and the second metal member 512b may have different thermal expansion coefficients from each other. For example, the first metal member 512a may have a higher thermal expansion coefficient than the second metal member 512b. The first metal member 512a may include iron or an iron-nickel-chromium alloy. The second metal member 512b may be metal having a lower thermal expansion coefficient than the first metal member 512a, and may include nickel, chromium, zinc, or copper. Since the first metal member 512a has a higher thermal expansion coefficient than the second metal member 512b, if the temperature rises, the first metal member 512a may expand to a larger volume than the second metal member 512b. The first metal member 512a may be arranged between the first magnet 510 and the second metal member 512b. The first metal member 512a may be arranged closer to the first magnet 510 than the second metal member 512b. The first metal member 512a may face the first magnet 510, and the second metal member 512b may face the first support member 511.

Since the first bimetal member 512 is formed of the first metal member 512a and the second metal member 512b having different thermal expansion coefficients, the first bimetal member 512 may be bent or deformed if the temperature increases. Even if the first bimetal member 512 is deformed under the effect of temperature, the first bimetal member 512 may be supported by the first support member 511, thereby preventing separation thereof.

Referring to FIG. 6B, the first bimetal member 512 may maintain the original shape thereof without being deformed at a first temperature. The first bimetal member 512 may be deformed as the temperature increases.

Referring to FIG. 6C, the first bimetal member 512 may be deformed as the temperature increases from the first temperature to a second temperature. Since at least a portion of the first bimetal member 512 is supported by the first support member 511, the first bimetal member 512 may be deformed without being separated from the first reception space when the temperature increases from the first temperature to the second temperature. Since the first metal member 512a having a high thermal expansion coefficient is interposed between the first magnet 510 and the second metal member 512b, if the temperature increases, the first bimetal member 512 may be bent in the direction toward the first magnet 510. The degree of deformation of the first bimetal member 512 may be proportional to the temperature. The degree of deformation of the first bimetal member 512 may be proportional to the difference in the thermal expansion coefficient between the first metal member 512a and the second metal member 512b. The direction in which the first bimetal member 512 is bent due to temperature may vary depending on the arrangement of the first metal member 512a and the second metal member 512b of the first bimetal member 512.

The length of the first bimetal member 512 may vary depending on temperature. Referring to FIGS. 6B and 6C, the first bimetal member 512 may have a length l1 at a first temperature, and may have a length l2 at a second temperature higher than the first temperature. The length l2 is greater than the length l1.

The first reception space formed in the first support member 511 may have a length greater than or equal to the length l1 and less than the length l2 so that the first bimetal member 512 may be bent according to an increase in temperature. Even if the first bimetal member 512 is deformed with temperature, the first bimetal member 512 may be bent toward the first magnet 510 without being separated therefrom.

The first magnet 510 may be arranged between the flexible display 200 and the first bimetal member 512. The first magnet 510 may be arranged in the first reception space formed in the first support member 511 and/or the second reception space formed in the first side member 514. A portion of the first magnet 510 may overlap a portion of the flexible display 200. The magnetic force of the first magnet 510 may vary depending on the temperature.

The first magnet 510 may move along the y-axis according to the bending of the first bimetal member 512. The distance between the first magnet 510 and the flexible display 200 may vary depending on the degree of bending of the first bimetal member 512.

Referring to FIG. 6B, the first magnet 510 may be spaced a distance d1 apart from the flexible display 200 at a first temperature. The first magnet 510 may be closer to the flexible display 200 at a temperature higher than the first temperature.

Referring to FIG. 6C, the first magnet 510 may be spaced a distance d2 apart from the flexible display 200 at a second temperature higher than the first temperature. The distance d2 is shorter than the distance d1.

The first magnet 510 may move along the y-axis by the first bimetal member 512 as the temperature increases. As the temperature increases from the first temperature to the second temperature, the first magnet 510 may move along the y-axis by the difference between the distance d1 and the distance d2. The first magnet 510 may be brought closer to the flexible display 200 in proportion to the rise in temperature.

The amount of displacement of the first magnet 510 depending on the amount of change in temperature may vary depending on the degree of bending of the first bimetal member 512. The degree of bending of the first bimetal member 512 depending on the amount of change in temperature may vary depending on the difference in the thermal expansion coefficient between the first metal member 512a and the second metal member 512b or the shape (e.g., length, width, or thickness) of the first bimetal member 512.

The first elastic member 513 may be arranged between the flexible display 200 and the first magnet 510. The first elastic member 513 may have one surface in contact with the first magnet 510 and the opposite surface in contact with the first side member 514. The first elastic member 513 may support the first magnet 510.

The first elastic member 513 may be compressed by external force, and may be restored when the external force is removed. The first elastic member 513 may include rubber or a compression sponge.

If the first magnet 510 moves along the y-axis due to the increase in temperature from the first temperature to the second temperature, the first elastic member 513 may receive external force from the magnet. The first elastic member 513 may be compressed by the first magnet 510 according to the increase in temperature. If the external force from the first magnet 510 is removed due to a reduction in the temperature, the first elastic member 513 may be restored again.

The amount of displacement of the first magnet 510 depending on the amount of change in temperature may vary depending on the compression ratio of the first elastic member 513 against external force.

The first elastic member 513 may be omitted.

The first side member 514 may be arranged between the flexible display 200 and the first housing structure 310. A portion of the first side member 514 may be arranged in contact with the first housing structure 310. Alternatively, the first side member 514 may be integrally formed with the first housing structure 310 and extend from one area of the first housing structure 310 to the inside of the foldable housing 300.

The first side member 514 may form a second reception space for various components arranged therein. The second reception space of the first side member 514 may receive at least a portion of the first support member 511, the first magnet 510, and the first elastic member 513. The reception space formed by the first support member 511 and the first side member 514 may include the first reception space and the second reception space, and may receive the first bimetal member 512, the first magnet 510, and the first elastic member 513 therein.

The second reception space of the first side member 514 may be formed in a form surrounding at least some of the components that are received in the second reception space. The second reception space of the first side member 514 may be formed in a form surrounding at least a portion of the first support member 511, at least a portion of the first elastic member 513, and at least a portion of the first magnet 510. The reception space formed in the first support member 511 and the first side member 514 may surround the first support member 511, the first elastic member 513, the first magnet 510, and the first bimetal member 512.

The first support member 511 and the first side member 514 may support the first magnet 510 while preventing the first magnet 510 from moving along the x-axis. Even if the first bimetal member 512 is bent toward the first magnet 510 due to an increase in temperature, the first magnet 510 may move only along the y-axis, instead of the x-axis.

Figure 7A:
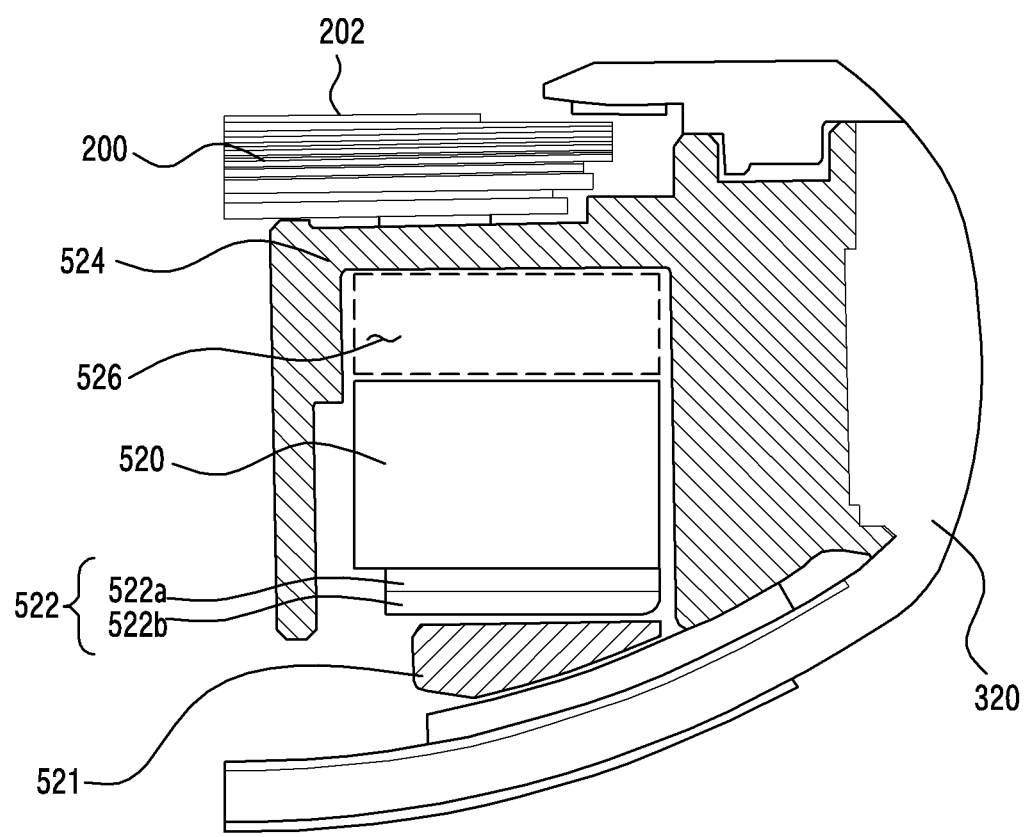
FIG. 7A illustrates a cross-sectional view of the electronic device in FIG. 5A viewed from the line D-D' according to an embodiment.
Figure 7B:
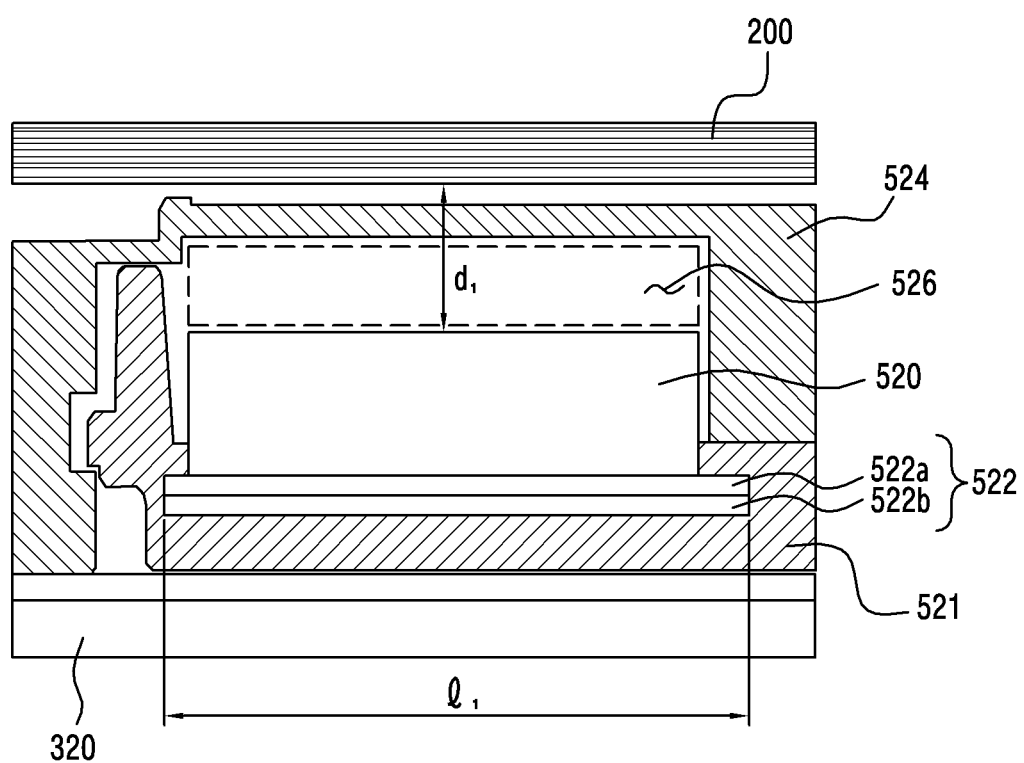
FIG. 7B illustrates a cross-sectional view of the electronic device in FIG. 5A viewed from the line E-E' at a first temperature according to an embodiment.
Figure 7C:
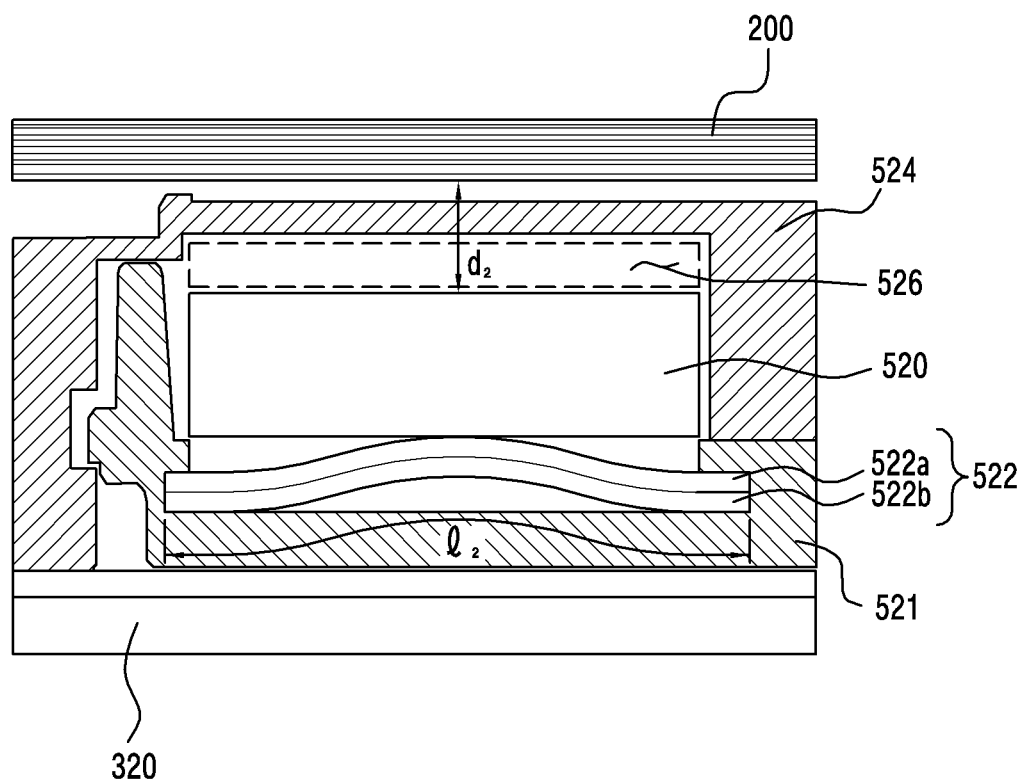
FIG. 7C illustrates a cross-sectional view of the electronic device in FIG. 5A viewed from the line E-E' at a second temperature higher than the first temperature according to an embodiment.

FIG. 7A illustrates a cross-sectional view of the electronic device in FIG. 5A viewed from the line D-D' according to an embodiment, FIG. 7B illustrates a cross-sectional view of the electronic device in FIG. 5A viewed from the line E-E' at a first temperature according to an embodiment, and FIG. 7C illustrates a cross-sectional view of the electronic device in FIG. 5A viewed from the line E-E' at a second temperature higher than the first temperature according to an embodiment.

Referring to FIGS. 7A, 7B, and 7C, the electronic device 101 includes a second support member 521, a second bimetal member 522, a second magnet 520, and the second side member 524.

The configurations of the second support member 521, the second bimetal member 522, the second magnet 520, and the second side member 524 are the same as or similar to those of the first support member 511, the first bimetal member 512, the first magnet 510, and the first side member 514 described with reference to FIGS. 6A to 6C, and only the positions of arrangement inside the electronic device 101 differ therebetween, so a duplicate description thereof will be omitted.

The second support member 521, the second bimetal member 522, the second magnet 520, and the second side member 524 may be arranged between the second area 202 of the flexible display 200 and the second rear cover 390 of the second housing structure 320.

An elastic member corresponding to the first elastic member 513 may be omitted, instead of being arranged inside the second housing structure 310. By omitting the elastic member, a space 526 may be formed between the second side member 524 and the second magnet 520. The electronic device 101 may include the first elastic member 513 only inside the first housing structure 310, and may omit the elastic member from the inside of the second housing structure 320.

Alternatively, the elastic member may be arranged in the space 526 of the second housing structure 320. The elastic member arranged in the space 526 may correspond to the first elastic member 513. The electronic device 101 may include both the first elastic member 513 arranged inside the first housing structure 310 and the elastic member arranged inside the second housing structure 320.

Alternatively, the first elastic member 513 arranged inside the first housing structure 310 may be omitted. The electronic device 101 may include the elastic member only inside the second housing structure 320. The electronic device 101 may omit the elastic members arranged inside both of the first housing structure 310 and the second housing structure 320.

Figure 8A:
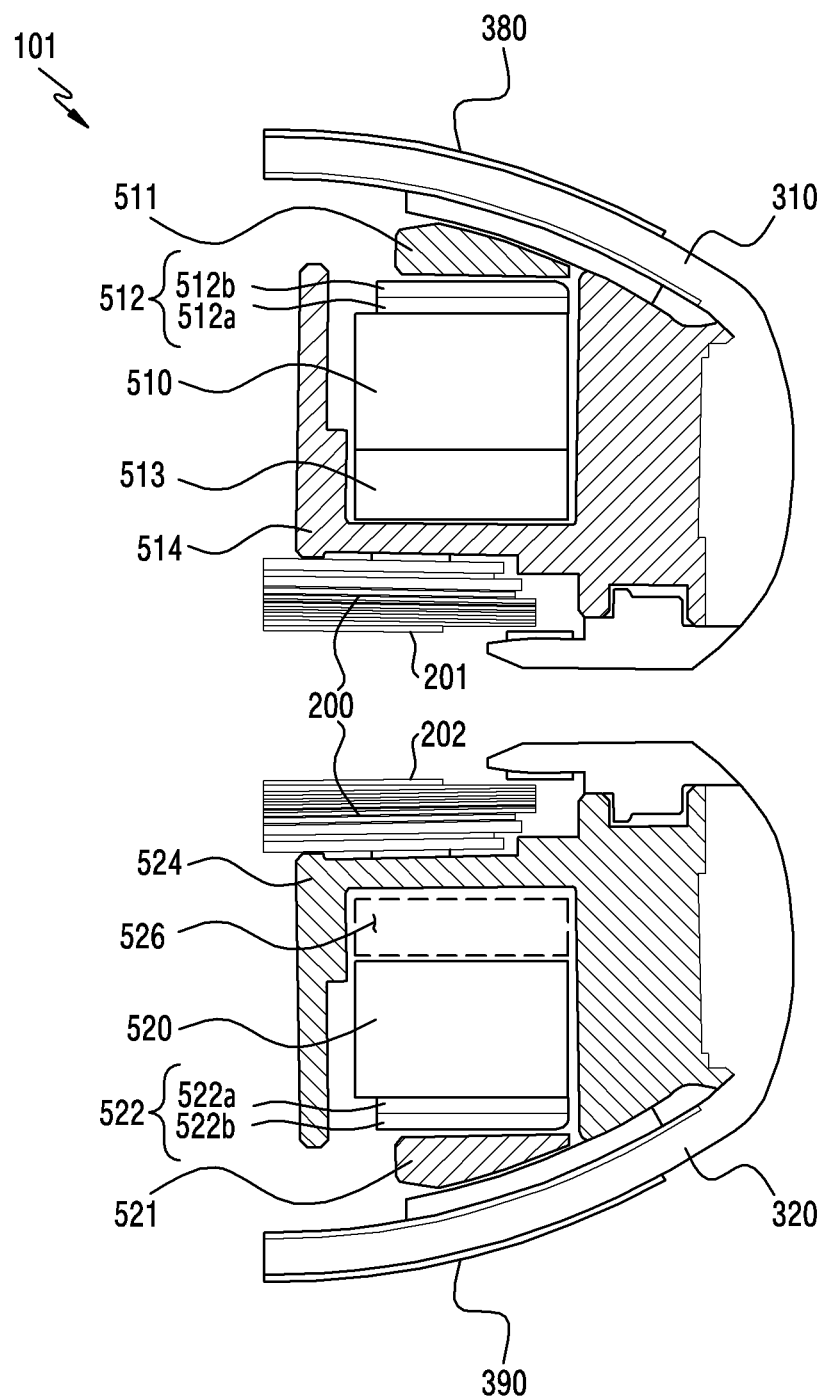
FIG. 8A illustrates a cross-sectional view of the electronic device in FIG. 5B viewed from the line F-F' according to an embodiment.
Figure 8B:
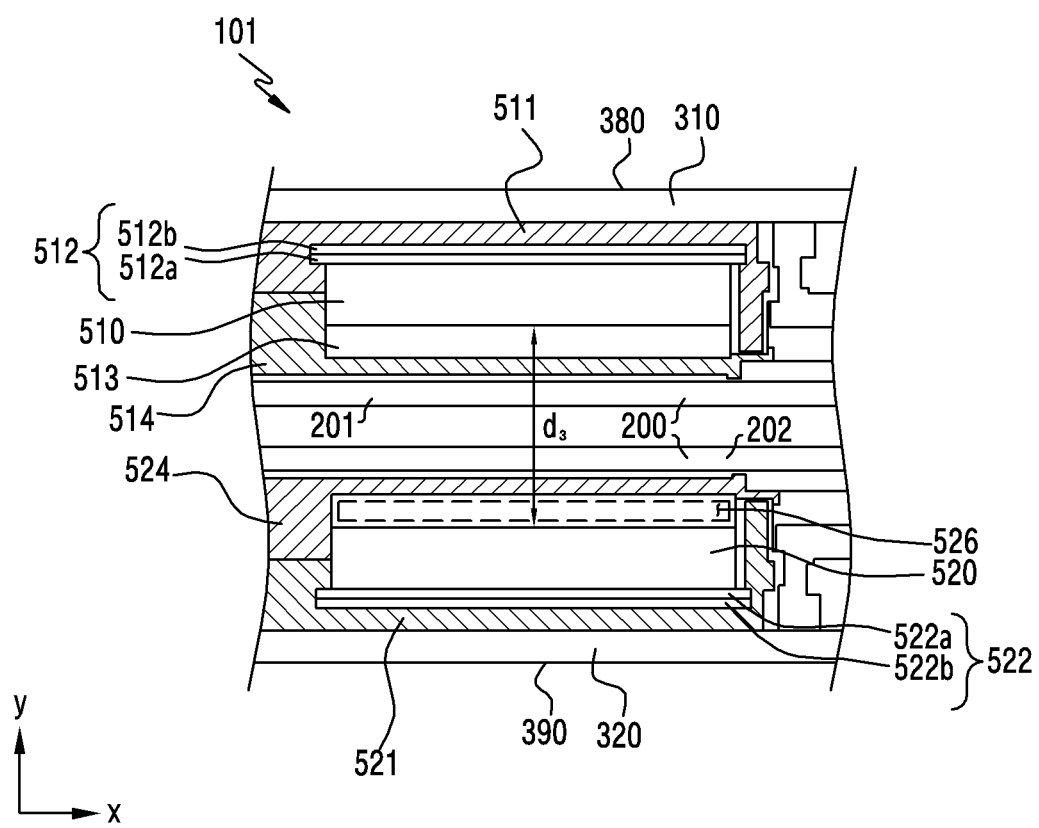
FIG. 8B illustrates a cross-sectional view of the electronic device in FIG. 5B viewed from the line G-G' at a first temperature according to an embodiment.
Figure 8C:
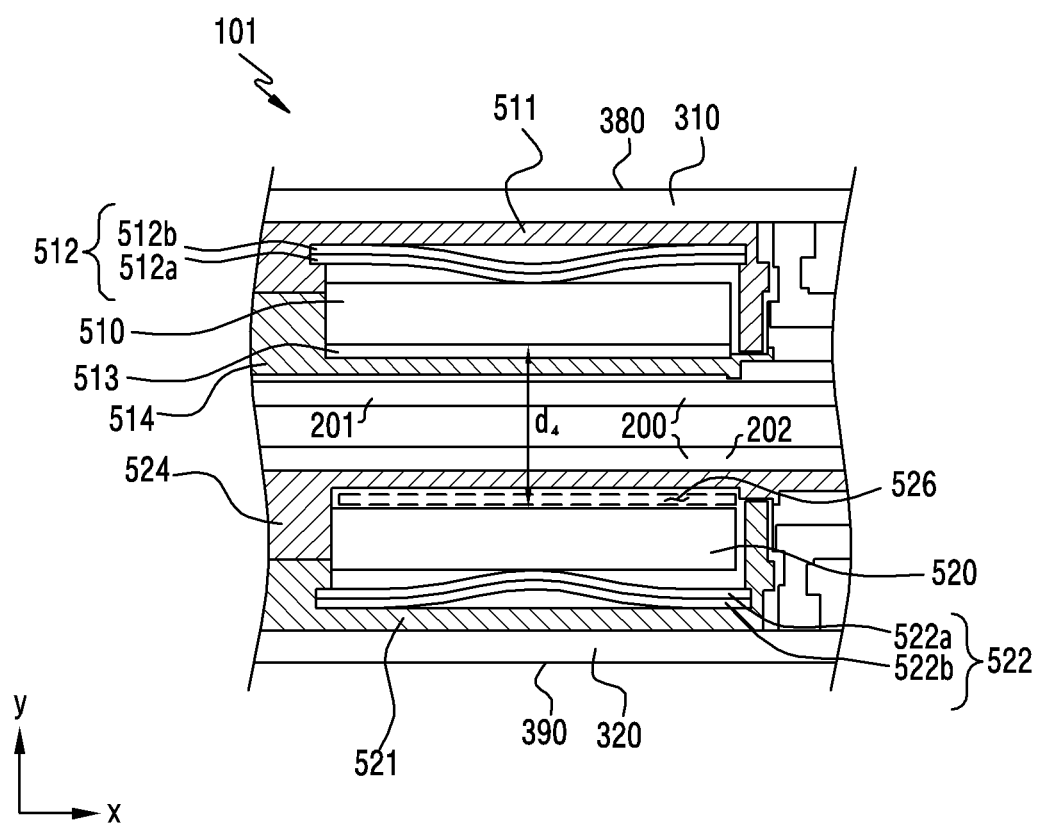
FIG. 8C illustrates a cross-sectional view of the electronic device in FIG. 5B viewed from the line G-G' at a second temperature higher than the first temperature according to an embodiment.

FIG. 8A illustrates a cross-sectional view of the electronic device in FIG. 5B viewed from the line F-F according to an embodiment, FIG. 8B illustrates a cross-sectional view of the electronic device in FIG. 5B viewed from the line G-G' at a first temperature according to an embodiment, and FIG. 8C illustrates a cross-sectional view of the electronic device in FIG. 5B viewed from the line G-G' at a second temperature higher than the first temperature according to an embodiment.

The configurations illustrated in FIGS. 8A, 8B, and 8C are the same as those described with reference to FIGS. 6A to 7C, except that the electronic device 101 is in a folded state, and thus, duplicate descriptions thereof will be omitted.

Although FIGS. 8A, 8B, and 8C illustrate only the fully folded state of the electronic device 101, this is only for the convenience of description and is not intended to exclude the reversely folded state of the electronic device 101.

When the electronic device 101 is in a folded state, the positions at which the first magnet 510 and the second magnet 520 are arranged may correspond to each other. For example, when the electronic device 101 is in the folded state, the first magnet 510 and the second magnet 520 may be stacked, or may overlap each other.

The first magnet 510 includes a surface facing the first area 201 and a surface facing the first rear cover 380. The second magnet 520 includes a surface facing the second area 202 and a surface facing the second rear cover 390. The surface of the first magnet 510 facing the first area 201 and the surface of the second magnet 520 facing the second area 202 may have different poles from each other. The surface of the first magnet 510 facing the first rear cover 380 and the surface of the second magnet 520 facing the second rear cover 390 may have different poles from each other.

Since the surfaces of the first magnet 510 and the second magnet 520, which face each other, have different poles from each other, attractive force may act on the first magnet 510 and the second magnet 520. The strength of the force of attraction between the first magnet 510 and the second magnet 520 may vary depending on the distance between the first magnet 510 and the second magnet 520. For example, as the distance between the first magnet 510 and the second magnet 520 is reduced, the strength of the force of attraction between the first magnet 510 and the second magnet 520 may increase.

Referring to FIG. 8B, the first bimetal member 512 and the second bimetal member 522 may maintain the original shapes thereof without being deformed at a first temperature. The first bimetal member 512 and the second bimetal member 522 may be deformed as the temperature increases.

Referring to FIG. 8C, the first bimetal member 512 and the second bimetal member 522 may be deformed as the temperature increases from the first temperature to the second temperature. Since the first metal member 512a having a high thermal expansion coefficient is interposed between the first magnet 510 and the second metal member 512b, if the temperature increases, the first bimetal member 512 may be bent in the direction toward the first magnet 510. Since the third metal member 522a having a high thermal expansion coefficient is interposed between the second magnet 520 and the fourth metal member 522b, if the temperature increases, the second bimetal member 522 may be bent in the direction toward the second magnet 520. The degrees of deformation of the first bimetal member 512 and the second bimetal member 522 may be proportional to the temperature.

The first magnet 510 may move along the y-axis according to the bending of the first bimetal member 512. The second magnet 520 may move along the y-axis according to the bending of the second bimetal member 522. The distance between the first magnet 510 and the second magnet 520 may vary depending on the degrees of bending of the first bimetal member 512 and the second bimetal member 522.

Referring to FIG. 8B, the first magnet 510 may be spaced a distance d3 apart from the second magnet 520 at a first temperature. The first magnet 510 may be closer to the second magnet 520 at a temperature higher than the first temperature.

Referring to FIG. 8C, the first magnet 510 may be spaced a distance d4 apart from the second magnet 520 at a second temperature higher than the first temperature. The distance d4 may be shorter than the distance d3. The first magnet 510 and the second magnet 520 may become closer to each other by the difference between the distance d3 and the distance d4 as the temperature increases from the first temperature to the second temperature. The distance between the first magnet 510 and the second magnet 520 may be inversely proportional to the amount of change in temperature.

The magnetic force of the first magnet 510 and the second magnet 520 may be reduced as the temperature increases. While the electronic device 101 is in the folded state, the strength of the force of attraction between the first magnet 510 and the second magnet 520, which are spaced a predetermined distance apart from each other, may be reduced as the temperature increases.

The strength of the force of attraction between the first magnet 510 and the second magnet 520 at the same temperature may increase as the distance between the first magnet 510 and the second magnet 520 is reduced.

Even if the strength of the magnetic force between the first magnet 510 and the second magnet 520 is reduced with the increase in temperature from the first temperature to the second temperature, the reduced strength of the magnetic force may be compensated for by adjusting the distance between the first magnet 510 and the second magnet 520. By adjusting the distance between the first magnet 510 and the second magnet 520, the force of attraction between the first magnet 510 and the second magnet 520 may remain the same even if the temperature changes. Even if the strength of the attractive force is reduced with the increase in temperature from the first temperature to the second temperature, the reduced strength of the attractive force may be compensated for by adjusting the distance between the first magnet 510 and the second magnet 520 from the distance d3 to the distance d4. The force of attraction between the first magnet 510 and the second magnet 520 may remain the same by adjusting the distance between the first magnet 510 and the second magnet 520 from the distance d3 to the distance d4 even if the temperature changes.

The amount of change in the shape of the bimetal member depending on the amount of change in temperature may vary depending on the difference in thermal expansion coefficient between different metals. The amount of change in the shape of the first bimetal member 512 depending on the temperature may vary depending on the difference in thermal expansion coefficient between the first metal member 512a and the second metal member 512b. The amount of change in the shape of the second bimetal member 522 depending on the temperature may vary depending on the difference in thermal expansion coefficient between the third metal member 522a and the fourth metal member 522b. The amount of change in the shape depending on the temperature may increase as the difference in thermal expansion coefficient between different metals increases.

The amount of displacement of the magnet depending on the amount of change in temperature may vary depending on the degree of bending of the bimetal member and a compression ratio of the elastic member. The degree of bending of the bimetal member depending on the temperature may vary depending on the length, the width, and the thickness of the bimetal member.

Figure 9A:
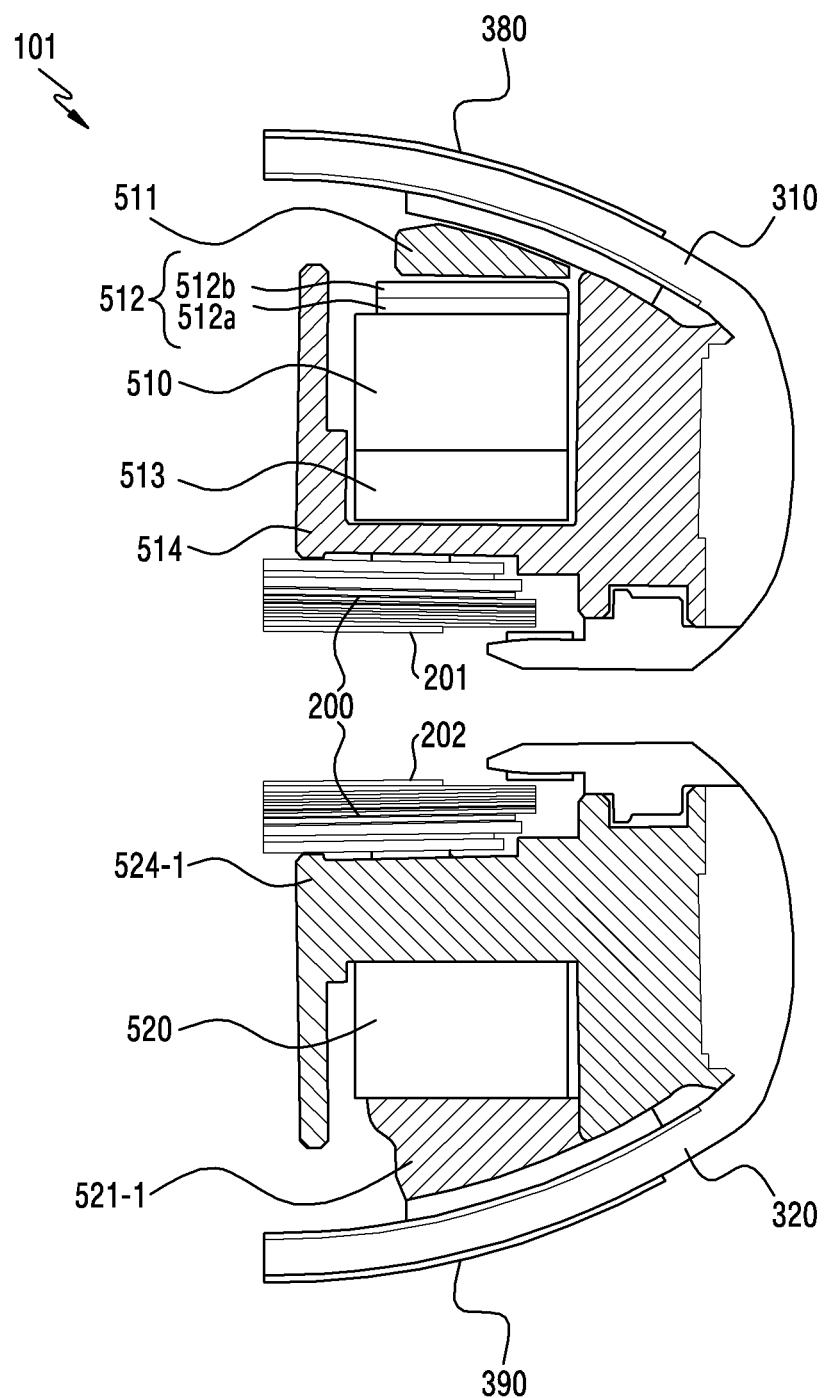
FIG. 9A illustrates a cross-sectional view of the electronic device in FIG. 5B viewed from the line F-F' according to an embodiment.
Figure 9B:
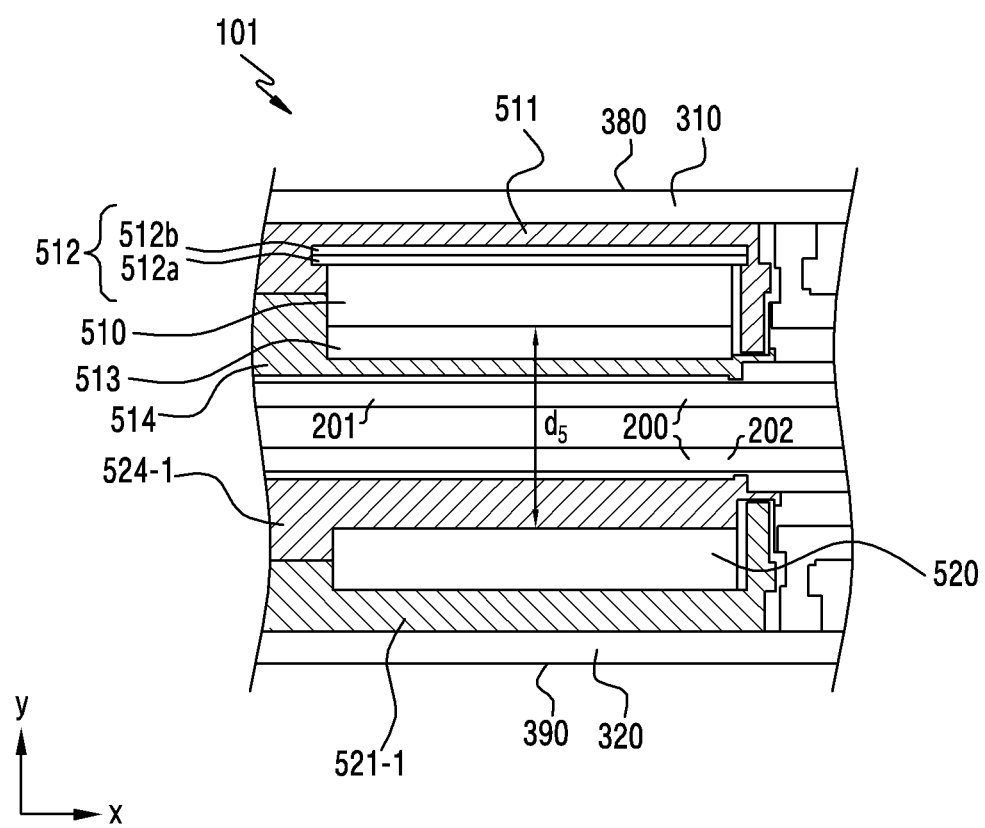
FIG. 9B illustrates a cross-sectional view of the electronic device in FIG. 5B viewed from the line G-G' at a first temperature according to an embodiment.
Figure 9C:
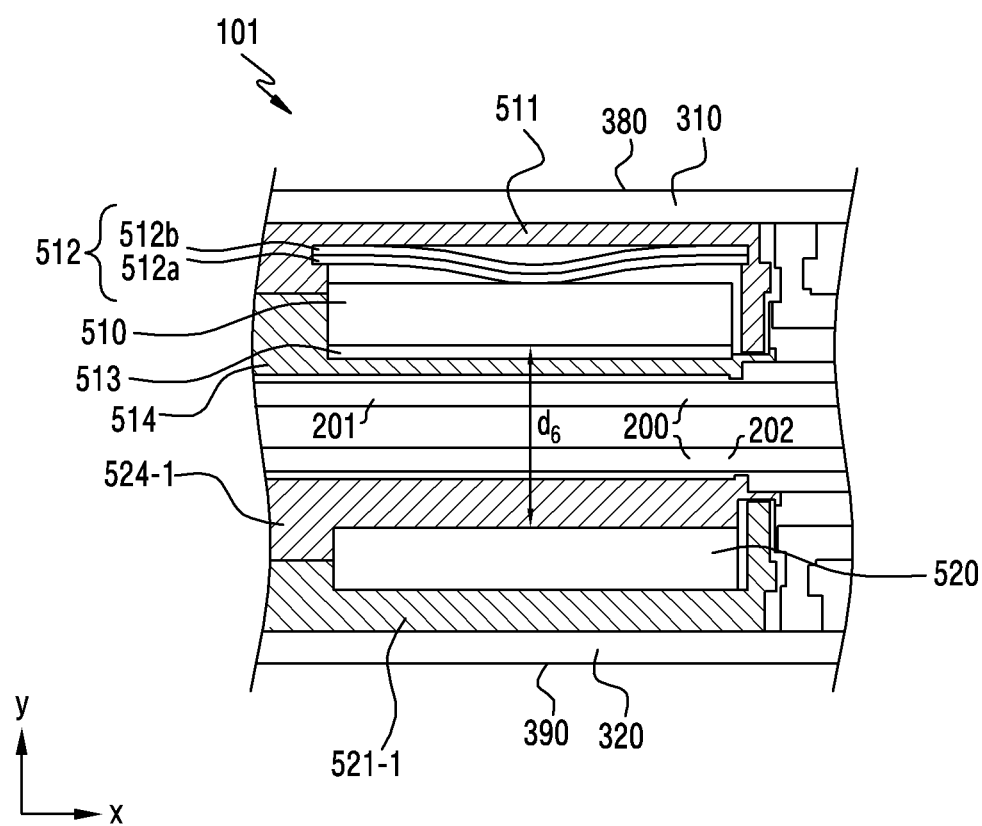
FIG. 9C illustrates a cross-sectional view of the electronic device in FIG. 5B viewed from the line G-G' at a second temperature higher than the first temperature according to an embodiment.

FIG. 9A illustrates a cross-sectional view of the electronic device in FIG. 5B viewed from the line F-F according to an embodiment, FIG. 9B illustrates a cross-sectional view of the electronic device in FIG. 5B viewed from the line G-G' at a first temperature according to an embodiment, and FIG. 9C illustrates a cross-sectional view of the electronic device in FIG. 5B viewed from the line G-G' at a second temperature higher than the first temperature according to an embodiment;

Since the electronic device illustrated in FIGS. 9A, 9B, and 9C is the same as or similar to the electronic device illustrated in FIGS. 8A to 8C, duplicate descriptions thereof will be omitted.

Referring to FIGS. 9A, 9B, and 9C, the electronic device 101 includes a second support member 521-1, a second magnet 520, and a second side member 524-1.

The second support member 521-1 may be arranged between the second area 202 of the flexible display 200 and the second rear cover 390 of the second housing structure 320. The second support member 521-1 may have one surface in contact with the second housing structure 320 and the opposite surface on which the second magnet 520 is arranged.

The second magnet 520 may be arranged between the second side member 524-1 and the second support member 521-1. The second magnet 520 may have one surface in contact with the second support member 521-1 and the opposite surface in contact with the second side member 524-1. The second magnet 520 may be supported by the second support member 521-1 and the second side member 524-1.

The first magnet 510 may move along the y-axis due to the bending of the first bimetal member 512. The distance between the first magnet 510 and the second magnet 520 may vary depending on the degree of bending of the first bimetal member 512.

Referring to FIG. 9B, the first magnet 510 may be spaced a distance d5 apart from the second magnet 520 at a first temperature. The first magnet 510 may become closer to the second magnet 520 at a temperature higher than the first temperature.

Referring to FIG. 9C, the first magnet 510 may be spaced a distance d6 apart from the second magnet 520 at a second temperature higher than the first temperature. The distance d6 is shorter than the distance d5. The first magnet 510 may become closer to the second magnet 520 by the difference between the distance d5 and the distance d6 as the temperature increases from the first temperature to the second temperature.

Figure 10A:
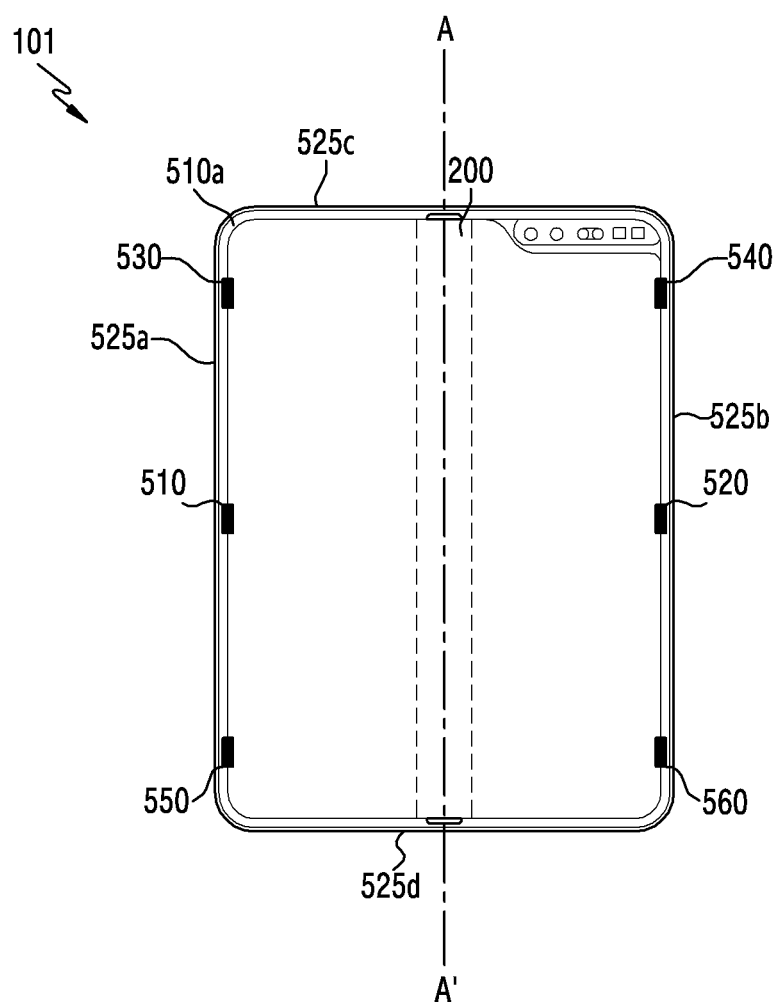
FIG. 10A illustrates an unfolded state of an electronic device including a plurality of magnets according to an embodiment.
Figure 10B:
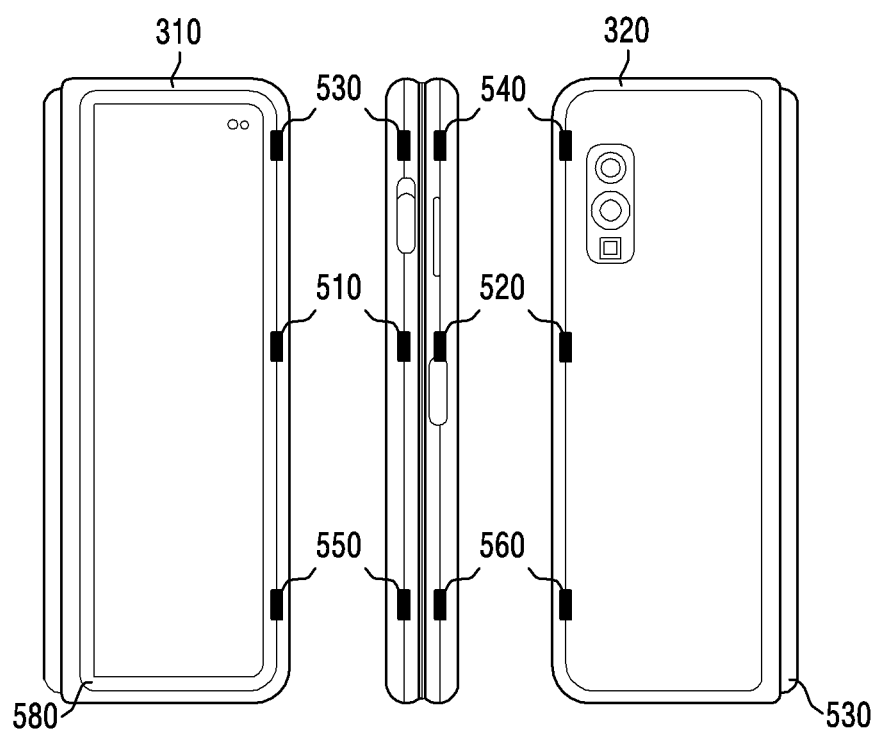
FIG. 10B illustrates a folded state of an electronic device including a plurality of magnets according to an embodiment.

FIG. 10A illustrates an unfolded state of an electronic device including a plurality of magnets according to an embodiment, and FIG. 10B illustrates a folded state of an electronic device including a plurality of magnets according to an embodiment.

The configuration illustrated in FIGS. 10A and 10B is the same as that described in the embodiments above, except that a third magnet 530, a fourth magnet 540, a fifth magnet 550, a sixth magnet 560, a seventh magnet 570, and an eighth magnet 580 are further included, and thus duplicate descriptions thereof will be omitted.

Although FIG. 10B illustrates the fully folded state of the electronic device 101, this is only for convenience of description, and is not intended to exclude the reversely folded state of the electronic device 101.

Referring to FIGS. 10A and 10B, the third magnet 530, the fourth magnet 540, the fifth magnet 550, the sixth magnet 560, the seventh magnet 570, and the eighth magnet 580 may be arranged between the flexible display 200 and the foldable housing 300. A portion of each of the third magnet 530, the fourth magnet 540, the fifth magnet 550, the sixth magnet 560, the seventh magnet 570, and the eighth magnet 580 may overlap a portion of the flexible display 200.

The third magnet 530 and the fifth magnet 550 may be arranged between the flexible display 200 and the first housing structure 310 so as to be spaced apart from the first magnet 510. The first magnet 510, the third magnet 530, and the fifth magnet 550 may be aligned along the first periphery 525a.

The fourth magnet 540 and the sixth magnet 560 may be arranged between the flexible display 200 and the second housing structure 320 so as to be spaced apart from the second magnet 520. The second magnet 520, the fourth magnet 540, and the sixth magnet 560 may be aligned along the second periphery 525b.

The seventh magnet 570 may be arranged between the flexible display 200 and the first housing structure 310.

The eighth magnet 580 may be arranged between the flexible display 200 and the second housing structure 320.

The seventh magnet 570 and the eighth magnet 580 may be aligned along the fourth periphery 525d.

The third magnet 530 and the fourth magnet 540 may correspond to the first magnet 510 and second magnet 520 described with reference to FIGS. 5A to 8C. The third magnet 530 and the fourth magnet 540 may perform the same functions as those of the first magnet 510 and the second magnet 520 described with reference to FIGS. 5A to 8C.

The fifth magnet 550 and the sixth magnet 560 may correspond to the first magnet 510 and the second magnet 520 described with reference to FIGS. 5A to 8C. The fifth magnet 550 and the sixth magnet 560 may perform the same functions as those of the first magnet 510 and the second magnet 520 described with reference to FIGS. 5A to 8C.

The seventh magnet 570 and the eighth magnet 580 may correspond to the first magnet 510 and the second magnet 520 described with reference to FIGS. 5A to 8C. The seventh magnet 570 and the eighth magnet 580 may perform the same functions as those of the first magnet 510 and second magnet 520 described with reference to FIGS. 5A to 8C.

During the operation of folding the electronic device 101, the strength of the force of attraction between the first housing structure 310 and the second housing structure 320 may vary depending on the number of magnets included in the electronic device 101. For example, as the number of magnets included in the electronic device 101 increases, the strength of the force of attraction between the first housing structure 310 and the second housing structure 320 may increase during the operation of folding the electronic device 101. The manipulation experience to the user during the operation of folding the electronic device 101 may vary depending on the strength of the force of attraction between the first housing structure 310 and the second housing structure 320.

An electronic device (e.g., the electronic device 101 in FIG. 5A) according to an embodiment may include a housing (e.g., the foldable housing 300 in FIG. 2) including a first housing structure (e.g., the first housing structure 310 in FIG. 5A), a second housing structure (e.g., the second housing structure 320 in FIG. 5A), and a hinge structure (e.g., the hinge structure 340 in FIG. 4) connecting the first housing structure and the second housing structure, the housing forming a rear surface (e.g., the rear surface 335 in FIG. 2) and a side surface (e.g., the side surface 325 in FIG. 2) of the electronic device while the electronic device is in an unfolded state; a flexible display (e.g., the flexible display 200 in FIG. 5A) arranged in a space formed by the housing and configured to form a front surface (e.g., the front surface 315 in FIG. 2) of the electronic device while the electronic device is in the unfolded state; a first support member (e.g., the first support member 511 in FIG. 6A) arranged between the flexible display and the first housing structure; a first bimetal member (e.g., the first bimetal member 512 in FIG. 6A) arranged between the flexible display and the first support member; a first magnet (e.g., the first magnet 510 in FIG. 5A) arranged between the flexible display and the first bimetal member; and a second magnet (e.g., the second magnet 520 in FIG. 5A) arranged between the flexible display and the second housing structure, wherein the second magnet is arranged at a position corresponding to the first magnet while the electronic device is in a folded state such that the first housing structure and the second housing structure face each other, wherein the first bimetal member has a first length (e.g., 11 in FIG. 6B) at a first temperature, and a second length (e.g., 12 in FIG. 6C) longer than the first length at a second temperature higher than the first temperature, and wherein the first support member has a reception space having a length greater than or equal to the first length and less than the second length so as to allow the first bimetal member to be bent at the second temperature.

The electronic device may further include a first elastic member (e.g., the first elastic member 513 in FIG. 6A) arranged between the flexible display and the first magnet.

The first elastic member may be rubber or compressed sponge.

The electronic device may further include a second support member (e.g., the second support member 521 in FIG. 7A) arranged between the second magnet and the second housing structure and a second bimetal member (e.g., the second bimetal member 522 in FIG. 7A) arranged between the second magnet and the second support member.

The second bimetal member may have a third length (e.g., 11 in FIG. 7B) at the first temperature and a fourth length (e.g., 12 in FIG. 7C) longer than the third length at the second temperature higher than the first temperature, and the second support member may have a reception space having a length greater than or equal to the third length and less than the fourth length so as to allow the second bimetal member to be bent toward the second magnet at the second temperature.

The electronic device may further include a second elastic member arranged between the flexible display and the second magnet.

The second elastic member may be rubber or compressed sponge.

The first bimetal member may include a first metal member (e.g., the first metal member 512a in FIG. 6A) facing the first magnet and a second metal member (e.g., the second metal member 512b in FIG. 6A) facing the first support member, and the first metal member may have a higher thermal expansion coefficient than the second metal member.

The flexible display may include a first area (e.g., the first area 201 in FIG. 5A) overlapping the first housing structure and a second area (e.g., the second area 202 in FIG. 5A) overlapping the second housing structure, and the first area and the second area may face each other while the electronic device is in a folded state.

The rear surface of the electronic device may include a third area (e.g., the first rear cover 380 in FIG. 5B) corresponding to the first housing structure and a fourth area (e.g., the second rear cover 390 in FIG. 5B) corresponding to the second housing structure, and the third area and the fourth area may face each other while the electronic device is in a folded state.

A portion of the first magnet may overlap a portion of the flexible display.

The first support member may further include a groove into which the first bimetal member is inserted.

The first magnet may be closer to the second magnet at the second temperature than at the first temperature while the electronic device is in a folded state.

The first magnet may be closer to the side of the electronic device than to the hinge structure.

The first magnet may overlap the first bimetal member.

An electronic device (e.g., the electronic device 101 in FIG. 5A) according to an embodiment may include a housing (e.g., the foldable housing 300 in FIG. 5A) including a first housing structure (e.g., the first housing structure 310 in FIG. 5A), a second housing structure (e.g., the second housing structure 320 in FIG. 5A), and a hinge structure (e.g., the hinge structure 340 in FIG. 4) connecting the first housing structure and the second housing structure, the housing forming a rear surface (e.g., the rear surface 535 in FIG. 2) and a side surface (e.g., the side surface 525 in FIG. 2) of the electronic device in an unfolded state; a flexible display (e.g., the flexible display 200 in FIG. 5A) arranged in a space formed by the housing and configured to form a front surface (e.g., the front surface 515 in FIG. 2) of the electronic device while the electronic device is in the unfolded state; a first support member (e.g., the first support member 511 in FIG. 6A) arranged between the flexible display and the first housing structure; a first bimetal member (e.g., the first bimetal member 512 in FIG. 6A) arranged between the flexible display and the first support member; a first magnet (e.g., the first magnet 510 in FIG. 5A) arranged between the flexible display and the first bimetal member; a first elastic member (e.g. the first elastic member 513 in FIG. 6A) arranged between the flexible display and the first magnet; and a second magnet (e.g., the second magnet 520 in FIG. 5A) arranged between the flexible display and the second housing structure, wherein the first magnet may overlap the first bimetal member and the first elastic member, wherein the second magnet may be arranged at a position corresponding to the first magnet such that the first housing structure and the second housing structure face each other while the electronic device is in a folded state, wherein the first bimetal member may have a first length (e.g., 11 in FIG. 6B) at a first temperature and a second length (e.g., 12 in FIG. 6C) longer than the first length at a second temperature higher than the first temperature, and wherein the first support member may have a reception space having a length greater than or equal to the first length and less than the second length so as to allow the first bimetal member to be bent toward the first magnet at the second temperature.

The electronic device may further include a second support member (e.g., the second support member 521 in FIG. 7A) arranged between the second magnet and the second housing structure, a second bimetal member (e.g., the second bimetal member 522 in FIG. 7A) arranged between the second magnet and the second support member, and a second elastic member arranged between the flexible display and the second magnet, wherein the second magnet may overlap the second elastic member and the second bimetal member.

The second bimetal member may have a third length (e.g., 11 in FIG. 7B) at the first temperature and a fourth length (e.g., 12 in FIG. 7C) longer than the third length at the second temperature higher than the first temperature, and the second support member may have a reception space having a length greater than or equal to the third length and less than the fourth length so as to allow the second bimetal member to be bent toward the second magnet at the second temperature.

A portion of the first magnet may overlap a portion of the flexible display.

The first magnet may be closer to the second magnet at the second temperature than at the first temperature while the electronic device is in a folded state.

An electronic device (e.g., the electronic device 101 in FIG. 5A) according to an embodiment may include a foldable housing (e.g., the foldable housing 300 in FIG. 2) including a first housing structure (e.g., the first housing structure 310 in FIG. 5A) and a second housing structure (e.g., the second housing structure 320 in FIG. 5A) connected to the first housing structure to be foldable, the first housing structure and the second housing structure including a hinge structure (e.g., the hinge structure 340 in FIG. 4) configured to cause the first housing structure and the second housing structure to substantially face each other while the electronic device is in a folded state and to cause the first housing structure and the second housing structure to form a substantially flat surface while the electronic device is in an unfolded state, and configured to form a rear surface and a side surface of the electronic device while the electronic device is in the unfolded state; a flexible display (e.g., the flexible display 200 in FIG. 5A) arranged in a space formed by the housing and configured to form a front surface of the electronic device while the electronic device is in the unfolded state; a first support member (e.g., the first support member 511 in FIG. 6A) arranged between the flexible display and the first housing structure; a first bimetal member (e.g., the first bimetal member 512 in FIG. 6A) arranged between the flexible display and the first support member; a first magnet (e.g., the first magnet 510 in FIG. 5A) arranged between the flexible display and the first bimetal member; and a second magnet (e.g., the second magnet 520 in FIG. 5A) arranged between the flexible display and the second housing structure, wherein the second magnet may be arranged at a position corresponding to the first magnet while the electronic device is in a folded state such that the first housing structure and the second housing structure face each other, wherein the first bimetal member may have a first length at a first temperature and a second length longer than the first length at a second temperature higher than the first temperature, and wherein the first support member may have a reception space having a length greater than or equal to the first length and less than the second length so as to allow the first bimetal member to be bent at the second temperature.

The first bimetal member may be bent toward the first magnet at the second temperature.

As described above, a foldable electronic device according to an embodiment is capable of compensating for changes in magnetic force by adjusting a distance between magnets, even if the magnetic force of the magnets changes with temperature.

A foldable electronic device according to an embodiment is also capable of providing a consistent manipulation experience to a user during a folding operation, without the influence of temperature.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. An electronic device, comprising:
a first housing;
a second housing;
a hinge pivotally connecting the first housing to the second housing, wherein the first housing and the second housing substantially face each other while the electronic device is in a folded state and the first housing and the second housing form a substantially flat surface while the electronic device is in a unfolded state;
a flexible display forming a front surface of the first housing and the second housing while the electronic device is in the unfolded state;
a first support member disposed between the flexible display and the first housing;
a first bimetal member disposed between the flexible display and the first support member;
a first magnet disposed between the flexible display and the first bimetal member; and
a second magnet disposed between the flexible display and the second housing,
wherein the first magnet and the second magnet are disposed at corresponding positions and face each other while the electronic device is in the folded state,
wherein the first bimetal member has a first length at a first temperature and a second length, which is longer than the first length, at a second temperature, which is higher than the first temperature, and
wherein the first support member has a reception space having a length greater than or equal to the first length and less than the second length that provides space for the first bimetal member to bend at the second temperature.

2. The electronic device of claim 1, further comprising a first elastic member disposed between the flexible display and the first magnet.

3. The electronic device of claim 2, wherein the first elastic member comprises at least one of rubber or compressed sponge.

4. The electronic device of claim 1, further comprising:
a second support member disposed between the second magnet and the second housing; and
a second bimetal member disposed between the second magnet and the second support member.

5. The electronic device of claim 4, wherein the second bimetal member has a third length at the first temperature, and a fourth length, which is longer than the third length, at the second temperature, and wherein the second support member has a second reception space having a length greater than or equal to the third length and less than the fourth length that provides space for the second bimetal member to bend toward the second magnet at the second temperature.

6. The electronic device of claim 4, further comprising a second elastic member disposed between the flexible display and the second magnet.

7. The electronic device of claim 1, wherein the first bimetal member bends toward the first magnet at the second temperature.

8. The electronic device of claim 1, wherein the first bimetal member comprises a first metal member facing the first magnet and a second metal member facing the first support member, and
wherein the first metal member has a higher thermal expansion coefficient than the second metal member.

9. The electronic device of claim 1, wherein the flexible display comprises a first area overlapping the first housing structure and a second area overlapping the second housing, and
wherein the first area and the second area face each other while the electronic device is in the folded state.

10. The electronic device of claim 1, wherein a rear surface of the electronic device comprises a third area corresponding to the first housing and a fourth area corresponding to the second housing, and
wherein the third area and the fourth area face each other while the electronic device is in the folded state.

11. The electronic device of claim 1, wherein a portion of the first magnet overlaps a portion of the flexible display.

12. The electronic device of claim 1, wherein the first support member comprises a groove for receiving the first bimetal member.

13. The electronic device of claim 1, wherein the first magnet is closer to the second magnet at the second temperature than at the first temperature while the electronic device is in the folded state.

14. The electronic device of claim 1, wherein the first magnet is closer to the side of the electronic device than to the hinge structure.

15. The electronic device of claim 1, wherein the first magnet overlaps the first bimetal member.

16. An electronic device comprising:
a first housing;
a second housing;
a hinge connecting the first housing and the second housing, wherein the first housing and the second housing form a substantially flat surface while the electronic device is in an unfolded state;
a flexible display disposed on a front surface of the first housing and the second housing while the electronic device is in the unfolded state;
a first support member disposed between the flexible display and the first housing;
a first bimetal member disposed between the flexible display and the first support member;
a first magnet disposed between the flexible display and the first bimetal member;
a first elastic member disposed between the flexible display and the first magnet; and
a second magnet disposed between the flexible display and the second housing,
wherein the first magnet overlaps the first bimetal member and the first elastic member,
wherein the first magnet and the second magnet are disposed at corresponding positions and face each other while the electronic device is in a folded state,
wherein the first bimetal member has a first length at a first temperature and a second length, which is longer than the first length, at a second temperature, which is higher than the first temperature, and
wherein the first support member has a reception space having a length greater than or equal to the first length and less than the second length that provides space for the first bimetal member to bend toward the first magnet at the second temperature.

17. The electronic device of claim 16, further comprising:
a second support member disposed between the second magnet and the second housing;
a second bimetal member disposed between the second magnet and the second support member; and
a second elastic member disposed between the flexible display and the second magnet,
wherein the second magnet overlaps the second elastic member and the second bimetal member.

18. The electronic device of claim 17, wherein the second bimetal member has a third length at the first temperature, and a fourth length, which is longer than the third length, at the second temperature, and
wherein the second support member has a reception space having a length greater than or equal to the third length and less than the fourth length that provide space for the second bimetal member to bend toward the second magnet at the second temperature.

19. The electronic device of claim 16, wherein a portion of the first magnet overlaps a portion of the flexible display.

20. The electronic device of claim 16, wherein the first magnet is closer to the second magnet at the second temperature than at the first temperature while the electronic device is in a folded state.

* * * * *